(12) United States Patent
Uhm

(10) Patent No.: US 10,230,256 B2
(45) Date of Patent: Mar. 12, 2019

(54) WIRELESS CHARGING ACCESSORY APPARATUS OF MOBILE DEVICE CAPABLE OF CHARGING DEVICES PLACED UPON

(71) Applicant: Samsung Electronics Co., Ltd., Suwon-si, Gyeonggi-do (KR)

(72) Inventor: Junwhon Uhm, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 15/371,717

(22) Filed: Dec. 7, 2016

(65) Prior Publication Data

US 2017/0170678 A1 Jun. 15, 2017

(30) Foreign Application Priority Data

Dec. 9, 2015 (KR) .................. 10-2015-0175298

(51) Int. Cl.
| | | |
|---|---|---|
| *H02J 7/00* | (2006.01) | |
| *H02J 7/02* | (2016.01) | |
| *H02J 50/70* | (2016.01) | |
| *H01R 24/60* | (2011.01) | |
| *H02J 7/04* | (2006.01) | |
| *H02J 50/10* | (2016.01) | |
| *H02J 50/12* | (2016.01) | |
| *H01R 107/00* | (2006.01) | |

(52) U.S. Cl.
CPC ............ *H02J 7/025* (2013.01); *H01R 24/60* (2013.01); *H02J 7/0044* (2013.01); *H02J 7/045* (2013.01); *H02J 50/10* (2016.02); *H02J 50/70* (2016.02); *H01R 2107/00* (2013.01); *H02J 50/12* (2016.02)

(58) Field of Classification Search
CPC .. H02J 7/025; H02J 50/10; H02J 50/70; H02J 7/0044; H02J 7/045; H02J 50/12; H01R 24/60; H01R 2107/00
USPC .......................................................... 320/108
See application file for complete search history.

(56) References Cited

U.S. PATENT DOCUMENTS

| | | | |
|---|---|---|---|
| 5,656,983 A * | 8/1997 | Ito ........................... | H01F 38/14 335/297 |
| 2011/0221389 A1 | 9/2011 | Won et al. | |
| 2012/0013295 A1* | 1/2012 | Yeh ......................... | H02J 7/025 320/108 |
| 2012/0057322 A1* | 3/2012 | Waffenschmidt ..... | H01F 27/365 361/816 |
| 2012/0169276 A1* | 7/2012 | Wang .................... | H02J 7/0042 320/108 |
| 2012/0281356 A1* | 11/2012 | Brewer .................. | A45C 11/00 361/679.55 |
| 2014/0132206 A1* | 5/2014 | Zhu ........................ | H02J 50/12 320/108 |
| 2015/0349578 A1* | 12/2015 | Hu ......................... | H02J 7/0042 320/108 |

* cited by examiner

*Primary Examiner* — Yalkew Fantu
*Assistant Examiner* — Mohammed J Sharief
(74) *Attorney, Agent, or Firm* — Jefferson IP Law, LLP

(57) ABSTRACT

A wireless charging accessory apparatus is provided. The wireless charging accessory apparatus may be electrically connected to a mobile device and can wirelessly charge a wearable device placed thereon. The wireless charging accessory apparatus may draw power from the mobile device to wirelessly charge the wearable device placed thereon.

17 Claims, 14 Drawing Sheets

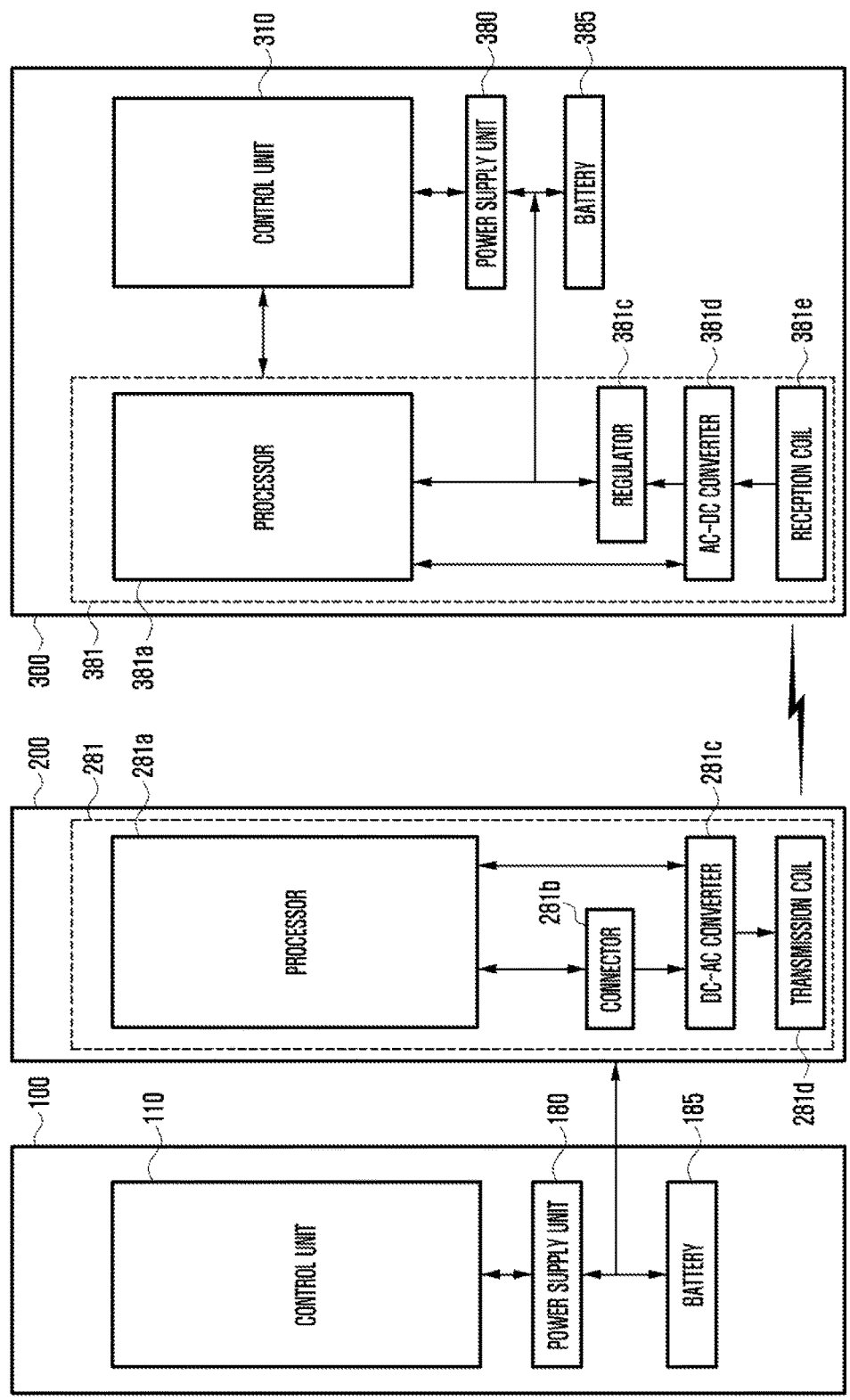

WIRELESS CHARGING ACCESSORY APPARATUS OF MOBILE DEVICE CAPABLE OF CHARGING DEVICES PLACED UPON

CROSS-REFERENCE TO RELATED APPLICATION(S)

This application claims the benefit under 35 U.S.C. § 119(a) of a Korean patent application filed on Dec. 9, 2015 in the Korean Intellectual Property Office and assigned Serial number 10-2015-0175298, the entire disclosure of which is hereby incorporated by reference.

TECHNICAL FIELD

The present disclosure relates to a wireless charging accessory apparatus. More particularly, the present disclosure relates to an accessory apparatus that is electrically connectable with a mobile device and is capable of wirelessly charging a wearable device or electronic device placed thereon.

BACKGROUND

Recently, mobile devices or wearable devices may support both wired charging and wireless charging. Wireless charging may be achieved by using electromagnetic induction, magnetic resonance, or the like.

A mobile device or wearable device may be wiredly charged through a travel adaptor connected to a power source. The mobile device or wearable device may also be wirelessly charged through a wireless charging pad.

It is necessary to charge a mobile device or wearable device through a travel adaptor or wireless charging pad when remaining battery power is low or insufficient.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless charging accessory apparatus that is capable of electrically connect with a mobile device and wirelessly charge a wearable device or electronic device placed thereon.

In accordance with an aspect of the present disclosure, an accessory apparatus for wirelessly charging an external device is provided. The accessory apparatus includes a front cover, a rear cover to accommodate a mobile device, and a coupling member to link the front cover and the rear cover. The accessory apparatus further includes a wireless power control processor, a connector to electrically connect the accessory apparatus to the mobile device, a direct current-alternating current (DC-AC) converter to convert DC power from the connector into AC power, and a transmission coil to wirelessly transmit power through magnetic fields generated by the AC power. The wireless power control processor, the DC-AC converter, and the transmission coil may be arranged in the front cover.

In accordance with another aspect of the present disclosure, an accessory apparatus is provided. The accessory apparatus includes a first cover to cover or expose a front face of a mobile device, a second cover having a space to accommodate the mobile device, a coupling member to link the first cover and the second cover, and a wireless power transmitter circuit placed in the first cover and configured to wirelessly transmit power through magnetic fields generated by AC power that is obtained via DC-AC conversion from DC power of a battery of the mobile device accommodated in the second cover.

In accordance with another aspect of the present disclosure, an accessory apparatus is provided. The accessory apparatus includes a first cover to cover or expose a front face of a mobile device, a second cover having a space to accommodate the mobile device, a coupling member to link the first cover and the second cover, a wireless power receiver circuit placed in the second cover and configured to wirelessly receive power from the mobile device accommodated in the second cover, and a wireless power transmitter circuit placed in the first cover and configured to wirelessly transmit power through magnetic fields generated by AC power that is obtained via DC-AC conversion from DC power of the wireless power receiver circuit placed in the second cover.

In accordance with another aspect of the present disclosure, an accessory apparatus is provided. The accessory apparatus includes a housing configured to at least partially cover one face of a mobile device and having a substantially flat region, a mounting structure placed at one face of the housing and configured to be removably mounted on the mobile device, a connector placed on the one face of the housing and configured to draw power from the mobile device, a wireless charging transmitter circuit electrically connected with the connector and placed in the housing, and a conductive pattern at least partially included in the substantially flat region and electrically connected with the wireless charging transmitter circuit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 2A, 2B, and 2C are schematic block diagrams of a mobile device, accessory apparatus, and wearable device according to an embodiment of the present disclosure;

Throughout the drawings, like reference numerals will be understood to refer to like parts, components, and structures.

DETAILED DESCRIPTION

Figure 1A:
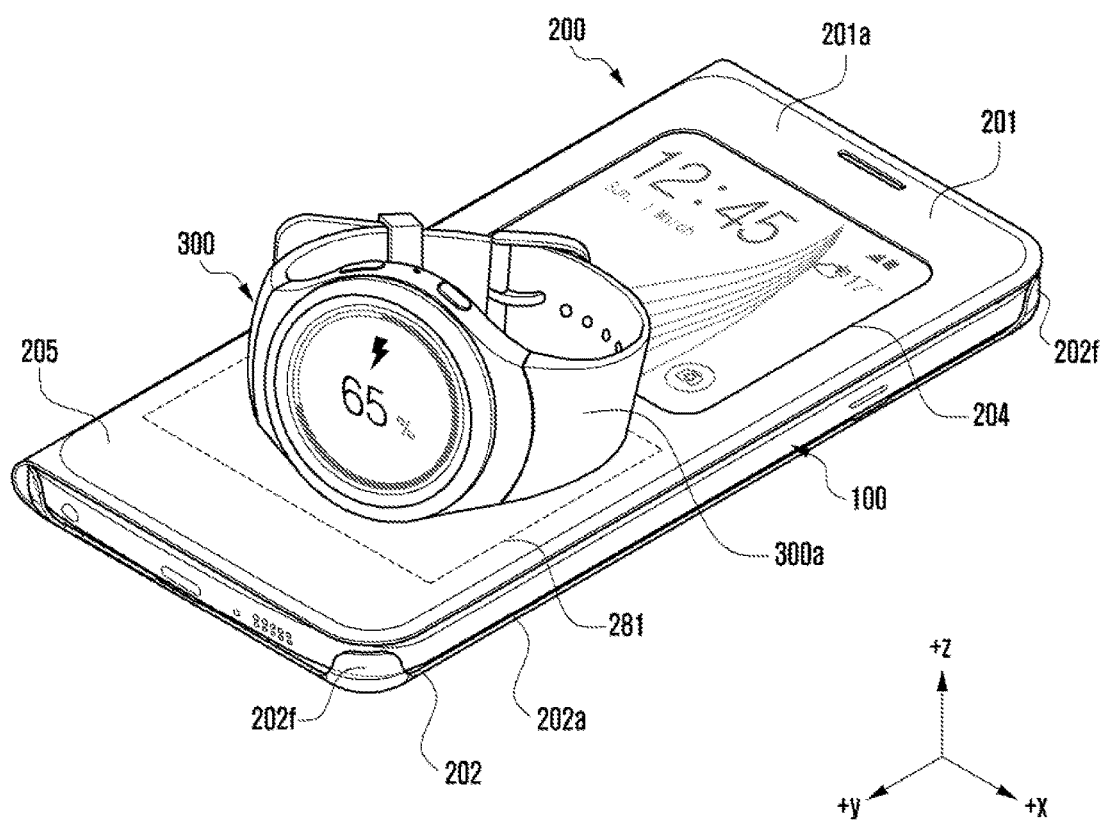
FIG. 1A is a schematic perspective view of a mobile device, accessory apparatus, and wearable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms first, second, third and the like in the description are used for distinguishing between similar elements and not necessarily for describing a sequential or chronological order. It is to be understood that the terms so used are interchangeable under appropriate circumstances. Furthermore, references such as "A and/or B" should be understood to mean embodiments having A or having B, as well as embodiments having both A and B.

In various embodiments of the present disclosure, an application indicates a piece of software that can be executed on top of an operating system (OS) of a computer or a mobile OS to serve the user. For example, applications may include a web browser, mobile payment application, photo album application, word processor, spread sheet, contacts application, calendar application, memo application, alarm application, social networking service (SNS) application, game store, chatting application, map application, music player, and video player.

In various embodiments, an application may be a piece of software executed by a mobile device or an external device (e.g. server) wiredly or wirelessly connected with the mobile device. An application may be a piece of software executed by a mobile device in response to user input.

Content may be displayed by a running application. For example, content may be a video or audio file played back by a video player, a music file played back by a music player, a photograph file displayed by a photo album application, a webpage displayed by a web browser, or payment information (e.g. mobile card number) sent by a mobile payment application.

Content may be a video file, audio file, text file, image file, or webpage that is displayed or played back by an application.

Content may be a video file, audio file, text file, image file, or webpage that may be played back or activated in response to reception of user input.

Content may be a user interface corresponding to the screen of an application in execution. Content may be composed of one or more pieces of content.

A widget is a mini-application having a graphical user interface (GUI) that enables smooth interaction between the user and the application or OS. For example, widgets may include a weather widget, calculator widget, and clock widget.

In various embodiments, user input may correspond to button or key selection by the user, button or key press by the user, button touch by the user, touch gesture made by the user, voice input of the user, presence of the user (e.g. appearance of the user in the sensing range of a camera), or motion of the user. Here, button or key selection, button or key press, button or key touch may be used interchangeably.

In various embodiments, a transmission coil or reception coil may be referred to as a conductive pattern.

It will be further understood that the terms "comprising", "including", "having" and variants thereof specify the presence of stated features, operations, elements, and/or components, but do not preclude the presence or addition of one or more other features, operations, elements, components, and/or groups thereof. The same reference number is given to the same or corresponding element in the drawings.

FIG. 1A is a schematic perspective view of a mobile device, accessory apparatus, and wearable device according to an embodiment of the present disclosure.

Figure 1B:
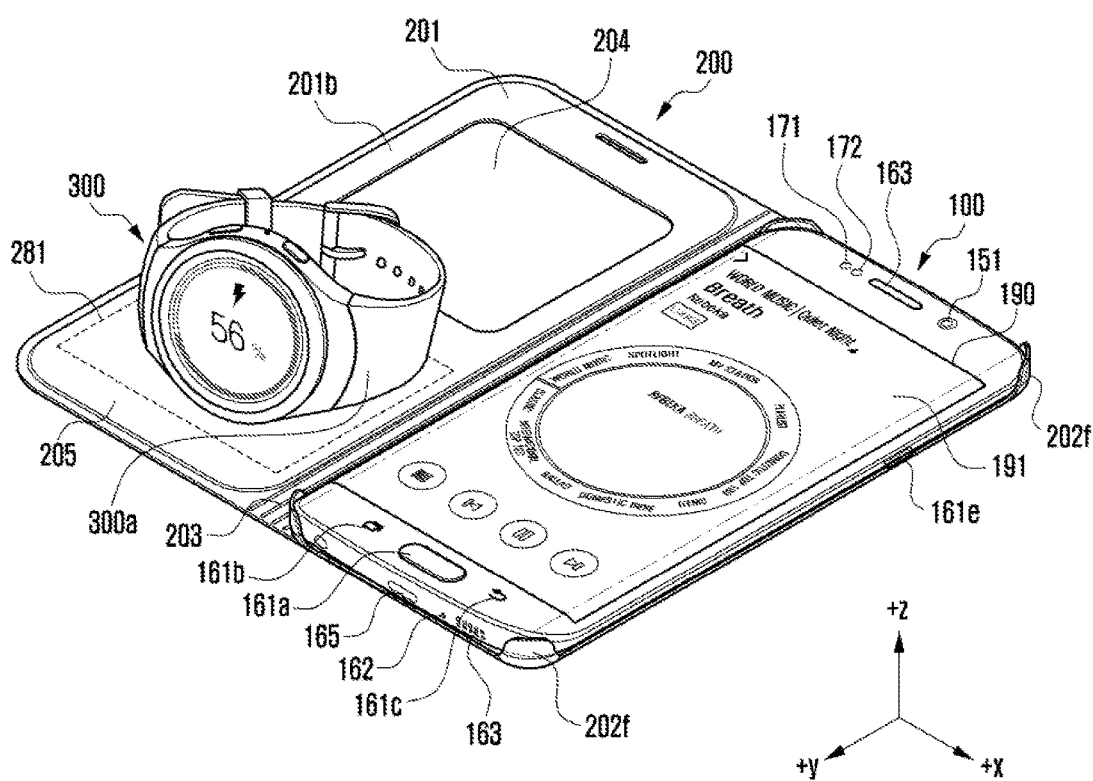
FIG. 1B is a schematic perspective view of a mobile device, accessory apparatus, and wearable device according to an embodiment of the present disclosure.

FIG. 1B is a schematic perspective view of a mobile device, accessory apparatus, and wearable device according to an embodiment of the present disclosure.

Referring to FIGS. 1A and 1B, a mobile device 100 may be installed in an accessory apparatus 200 (e.g. flip cover). A wearable device 300 (e.g. smart watch) may be placed on the front outer cover surface 201a of the accessory apparatus 200. Although not shown, another mobile device (e.g. smartphone) may be placed on the front outer cover surface 201a of the accessory apparatus 200.

Wireless charging of the wearable device 300 placed on the front outer cover surface 201a of the accessory apparatus 200 is described as an embodiment of the present disclosure. However, wireless charging may also be applied to other mobile or portable devices.

In one embodiment, the accessory apparatus 200 may include a front cover 201, a rear cover 202, and a coupling member 203. The front cover 201, rear cover 202, and coupling member 203 may constitute the housing of the accessory apparatus 200.

The housing of the accessory apparatus 200 may be configured to cover at least partially one face of the mobile device 100 (e.g. front face only, rear face only, or both front face and rear face) and may have a substantially flat region, such as substantially flat region 205 of the front cover 201.

In one embodiment, the accessory apparatus 200 may have only one of the front cover 201 and the rear cover 202. The accessory apparatus 200 having the rear cover 202 only may be attached to or installed on the rear face of the mobile device 100. The accessory apparatus 200 having the rear cover 202 only may be attached to or installed on the side of the mobile device 100. The accessory apparatus 200 having the front cover 201 only may be attached to or installed on the side of the mobile device 100.

The wearable device 300 placed on the front outer cover surface 201*a* may be wirelessly charged. The accessory apparatus 200 may include a wireless power transmitter 281 in the front cover 201 to wirelessly charge the wearable device 300. Another mobile device (not shown) placed on the front outer cover surface 201*a* may also be wirelessly charged. The accessory apparatus 200 may use the wireless power transmitter 281 in the front cover 201 to wirelessly charge such a mobile device (not shown).

The wireless power transmitter 281 may wirelessly transmit power to the wearable device 300 placed on one of the front outer cover surface 201*a* and the front inner cover surface 201*b* the front cover 201. The wireless power transmitter 281 may not be exposed to the outside. The wireless power transmitter 281 may draw power from a battery (not shown) of the mobile device 100 through a wired connection (not shown).

In the description, the word "unit" may be used interchangeably with "apparatus", "part", "component", "circuit", or the like. A unit may be a minimum entity with a single body or a portion thereof. A unit may be a minimum entity with one or more functions or a portion thereof. For example, the wireless power transmitter may be referred to as a wireless power transmission unit, wireless power transmission part, wireless power transmission component, or wireless power transmission circuit.

In one embodiment, the accessory apparatus 200 may be an accessory attachable to or mountable on the mobile device 100. The accessory apparatus 200 may draw power from the mobile device 100 via a wired or wireless connection to wirelessly charge the wearable device 300. The accessory apparatus 200 may draw power from an embedded battery (not shown) of the mobile device 300 to wirelessly charge the wearable device 300.

In the accessory apparatus 200 shown in FIGS. 1A and 1B, the front cover 201 may include a transparent region 204 made of a transparent or translucent material to enable the user to view a region of a screen, for example touchscreen 190, of the mobile device 100. Alternatively, the front cover 201 may not include the transparent region 204.

The user may view the screen of the mobile device 100 through the transparent region 204 of the front cover 201. For example, the user may identify content displayed on a region of the screen of the mobile device 100 through the transparent region 204 without opening the front cover 201.

In one embodiment, the wearable device 300 may be of a type wearable on the body of the user (e.g. head, forehead, chest, wrist, hand, or leg). The wearable device 300 may be a watch, ring, bracelet, anklet, glasses, contact lens, hearing aid, patch, or head mounted device (HMD). The wearable device 300 may also be a device that can be wirelessly charged through one of the front cover 201 or the rear cover 202 of the accessory apparatus 200.

In FIG. 1B, an application screen 191 (e.g. music player) is being displayed on a region of the touchscreen 190 of the mobile device 100. Multiple screens (not shown) may be displayed on the touchscreen 190. A shortcut icon associated with an application, weather widget, clock widget, and the like may be selectively displayed on a home screen in response to touch input or contactless hovering input.

Figure 2A:
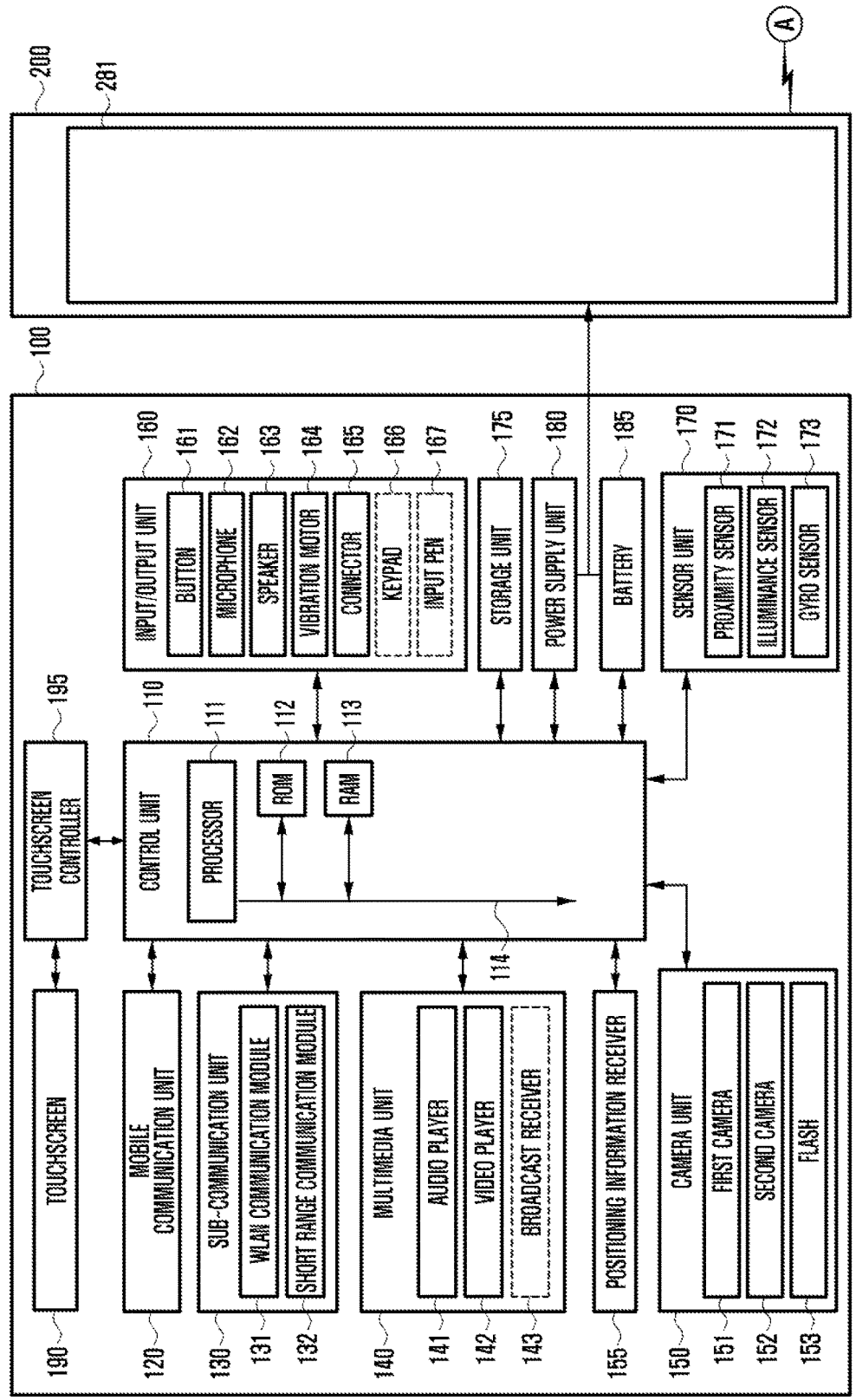
Figure 2B:
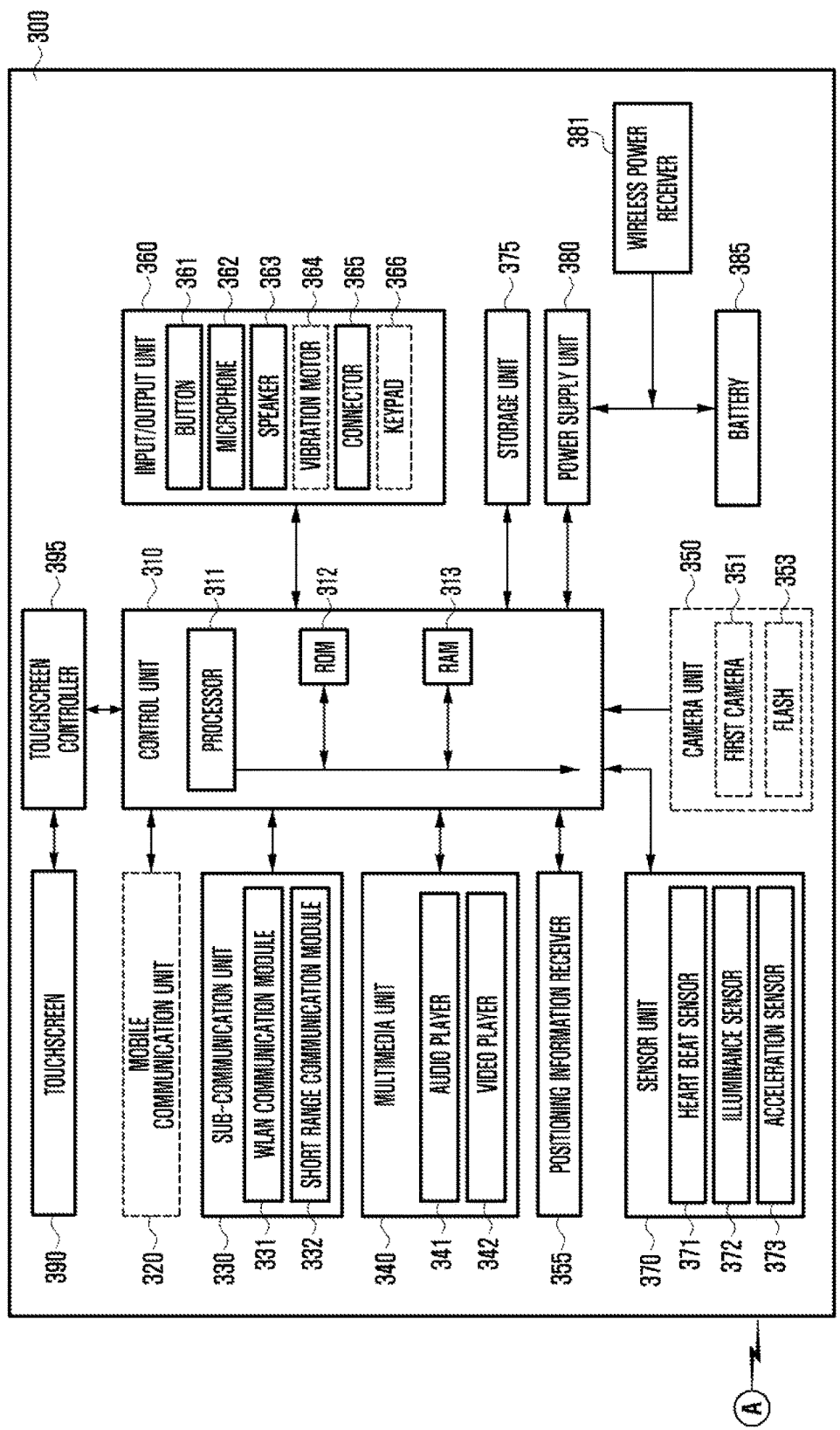

FIGS. 2A, 2B, and 2C are schematic block diagrams of a mobile device, accessory apparatus, and wearable device according to an embodiment of the present disclosure.

Referring to FIGS. 2A, 2B, and 2C, the mobile device 100 may use a mobile communication unit 120, a sub-communication unit 130, and a connector 165 to connect wiredly or wirelessly to another device (e.g. wearable device).

In various embodiments, the mobile device 100 may supply power to the accessory apparatus 200, which can wirelessly charge the wearable device 300. The mobile device 100 may be a mobile phone, smartphone, tablet computer, MP3 player, or video player. The mobile device 100 may also be any device to which the accessory apparatus 200 can be attached and which can supply power to the accessory apparatus 200 performing wireless charging of the wearable device 300.

The mobile device 100 may use the touchscreen 190 to send or receive data (related with a piece of content) to or from the outside through the mobile communication unit 120 or the sub-communication unit 130. The mobile device 100 may use the input pen 167 and the touchscreen 190 to send or receive data (related with a piece of content) to or from the outside through the mobile communication unit 120 or the sub-communication unit 130. The mobile device 100 may use a display unit (display panel only without touch panel, not shown) to send or receive data (related with a piece of content) to or from the outside through the mobile communication unit 120 or the sub-communication unit 130.

The mobile device 100 may further include a control unit 110, a multimedia unit 140, a camera unit 150, a positioning information receiver 155, an input/output unit 160, a sensor unit 170, a storage unit 175, and a power supply unit 180. The mobile device 100 may further include a touchscreen controller 195 for controlling the touchscreen 190.

The control unit 110 may include a processor 111. The control unit 110 may further include a read only memory (ROM) 112 to store control programs of the mobile device 100, and a random access memory (RAM) 113 to store signals and data received from the outside and data related with tasks in execution.

The control unit 110 may control the overall operation of the mobile device 100, control signal exchange between the internal components 120 to 195 of the mobile device 100, and perform data processing. The control unit 110 may use the power supply unit 180 to control power supply to the internal components 120 to 195.

The processor 111 may include a graphics processing unit (GPU, not shown) to process graphics data. The processor 111 may further include a sensor controller (not shown) to control sensors, and a communication processor (not shown) to control communication.

The processor 111 may be implemented as a system-on-chip (SoC) including a core (not shown) and a GPU (not shown). The processor 111 may include a single core, dual cores, triple cores, quad cores, or a multiple thereof. The processor 111, ROM 112 and RAM 113 may be interconnected with each other via a bus 114.

The control unit 110 may control the mobile communication unit 120, sub-communication unit 130, multimedia unit 140, camera unit 150, positioning information receiver 155, input/output unit 160, sensor unit 170, storage unit 175, power supply unit 180, touchscreen 190, and touchscreen controller 195.

The control unit 110 may control supply of power to the accessory apparatus 200 by use of contacts between the power supply unit 180 and the battery 185.

The control unit 110 may control a wireless power transceiver 181 of the mobile device 100 for wireless power transmission to the accessory apparatus 200.

The control unit 110 may provide the user with at least one of visual feedback, audible feedback, and tactile feedback in accordance with wired or wireless power transmission to the accessory apparatus 200.

In various embodiments, the words "control unit" of the mobile device 100 may be used as including the processor 111, ROM 112, and RAM 113.

Under the control of the control unit 110, the mobile communication unit 120 may use one or more antennas to connect to another device (e.g. mobile device, wearable device, or server) though a mobile communication network.

Under the control of the control unit 110, the sub-communication unit 130 may connect to another device (e.g. mobile device, wearable device, or server) though a wireless local area network (WLAN) communication module 131 or a short-range communication module 132.

Under the control of the control unit 110, the WLAN communication module 131 may wirelessly connect to an access point (AP). The WLAN communication module 131 may support Wi-Fi communication.

The short-range communication module 132 may support short-range communication based on at least one of Bluetooth, Bluetooth low energy, Infrared Data Association (IrDA), ultra-wideband (UWB), magnetic secure transmission (MST), and near field communication (NFC).

The mobile device 100 may be configured to include one or all of the mobile communication unit 120, WLAN communication module 131, and short-range communication module 132 according to the functionality and/or performance.

In various embodiments, the words "communication unit" may refer to the mobile communication unit 120 and/or the sub-communication unit 130.

The multimedia unit 140 may receive a broadcast from the outside, and play back audio data or video data under the control of the control unit 110.

The audio player 141 may play back an audio source material (e.g. audio file with extension "mp3", "wma", "ogg" or "way") pre-stored in the storage unit 175 or received from the outside by use of an audio codec under the control of the control unit 110.

In particular, the audio player 141 may generate audible feedback indicating wired or wireless power transmission to the accessory apparatus 200. For example, under the control of the control unit 110, the audio player 141 may generate audible feedback by playing back a stored audio source material using an audio codec when power is wiredly or wirelessly transmitted to the accessory apparatus 200.

The video player 142 may play back a video source material (e.g. video file with extension "mpeg", "mpg", "mp4", "avi", "mov", or "mkv") pre-stored in the storage unit 175 or received from the outside by use of a video codec under the control of the control unit 110.

In particular, the video player 142 may generate visual feedback indicating wired or wireless power transmission to the accessory apparatus 200. For example, the video player 142 may generate visual feedback by playing back a stored video source material using a video codec under the control of the control unit 110.

The broadcast receiver 143 may receive a broadcast signal (e.g. television (TV), radio or data broadcast) and associated supplementary information (e.g. electronic program guide (EPG), or electronic service guide (ESG)) from an external broadcast station through an antenna (not shown) under the control of the control unit 110.

The multimedia unit 140 may include the audio player 141 and the video player 142 only without the broadcast receiver 143 according to the configuration or performance of the mobile device 100. The control unit 110 may be configured to include the audio player 141 and video player 142 of the multimedia unit 140.

The camera unit 150 may capture a still or moving image under the control of the control unit 110. The camera unit 150 may include at least one of a first camera 151 serving as a front-facing camera and a second camera 152 serving as a rear-facing camera. That is, the camera unit 150 may include one or both of the first camera 151 and the second camera 152.

The camera unit 150 may include a supplementary light source (e.g. flash 153) to illuminate a dark scene for the first camera 151 or the second camera 152.

The camera unit 150 may further include a third camera (not shown) near to the first camera 151 at the front (e.g. with a gap of between 5 and 80 mm), and the first camera 151 and third camera may be realized as a single entity. The control unit 110 may use the first camera 151 and third camera in the front to take a three-dimensional (3D) still image or 3D moving image.

The camera unit 150 may further include a fourth camera (not shown) near to the second camera 152 at the back (e.g. with a gap of between 5 and 80 mm), and the second camera 152 and fourth camera may be realized as a single entity. The control unit 110 may use the second camera 152 and fourth camera in the back to take a 3D still image or 3D moving image.

The first camera 151 and second camera 152 may be used to take a wide-angle picture, close-up picture or telephotograph with the help of additional lenses (not shown) removably mounted on a separate adaptor (not shown).

The positioning information receiver 155 may receive signals (e.g. global positioning system (GPS) orbit information, time and navigation information) from multiple satellites orbiting the Earth on a periodic basis.

Using signals from multiple satellites, the mobile device 100 may identify the position thereof between the individual satellites and compute the distance based on the time difference between signal transmission and reception. The mobile device 100 may also compute the position, time, and speed thereof by means of triangulation. Orbit correction or time correction may require additional satellite signals.

In an indoor environment, the mobile device 100 may identify the position or speed thereof by use of wireless access points. The mobile device 100 may identify the position thereof on the basis of cell-identifiers (IDs), enhanced cell-IDs, or angle of arrival (AoA) measurement. The mobile device 100 may identify the position or speed thereof by use of wireless beacons in an indoor environment.

The input/output unit 160 may include at least one of one or more buttons 161, one or more microphones 162, one or more speakers 163, one or more vibration motors 164, a connector 165, a keypad 166, and an input pen 167.

Referring to FIGS. 1B and 2A, the buttons 161 may include a home button 161a, a recent app button 161b, and/or a back button 161c formed in the lower end region of the front face of the mobile device 100. The buttons 161 may include at least one volume button (not shown) and a power/lock button 161e formed at the sides of the mobile device 100. The buttons 161 may include the home button 161a, volume button, and power/lock button 161e only. The buttons 161 may include both physical buttons and virtual buttons. The buttons 161 may be represented in the form of a text, image, or icon on the touchscreen 190.

The control unit 110 may receive an electrical signal from a button 161 to which user input is applied. The control unit 110 may sense user input on the basis of a signal received from the button 161 (e.g. press or touch).

The description on the shape, position, function, or label of the buttons 161 shown in FIGS. 1A, 1B, 2A, 2B, and 2C is illustrative only. It should be understood that there may be various changes and modifications in details of the buttons 161.

The microphone 162 may pick up a voice or sound from the outside and generate a corresponding electrical signal under the control of the control unit 110. Under the control of the control unit 110, the electrical signal generated by the microphone 162 may be converted into digital data through an audio codec for being stored in the storage unit 175, or may be output to the speaker 163.

Referring to FIGS. 1B and 2A, the microphones 162 may be placed in the front face, rear face, and sides of the mobile device 100. The microphones 162 may be placed only in the sides of the mobile device 100.

The speaker 163 may output sounds corresponding to various signals (e.g. radio signal, broadcast signal, audio source, video file, and captured image) decoded by the audio codec.

Referring to FIGS. 1B and 2A, the speakers 163 may be placed in the front face, rear face, and sides of the mobile device 100. The speakers 163 may be placed only in the sides of the mobile device 100.

In particular, the speaker 163 may output audible feedback indicating wired or wireless power transmission to the accessory apparatus 200. For example, under the control of the control unit 110, the speaker 163 may generate audible feedback when power is wiredly or wirelessly transmitted to the accessory apparatus 200.

The vibration motor 164 may convert an electrical signal into mechanical vibration under the control of the control unit 110. The vibration motors 164 may include a linear vibration motor, bar type vibration motor, coin type vibration motor, and piezoelectric element vibration motor.

One or more vibration motors 164 may be placed in the mobile device 100. The vibration motor 164 may vibrate the whole of the mobile device 100 or vibrate a portion thereof locally.

In particular, the vibration motor 164 may output tactile feedback indicating wired or wireless power transmission to the accessory apparatus 200. The vibration motor 164 may output various types of tactile feedback (e.g. variations in intensity or duration of vibration) on the basis of stored or received information under the control of the control unit 110.

The connector 165 may be used as an interface for connecting the mobile device 100 with an external device (not shown) or power source (not shown). The connector 165 may be a micro universal serial bus (USB) or USB type C connector.

Through a cable connected to the connector 165, the mobile device 100 may send data (related with specific content) stored in the storage unit 175 to the outside or receive data (related with specific content) from the outside. Through a cable connected to the connector 165, the mobile device 100 may draw power from a power source (not shown) or charge the battery with power drawn from the power source. Through the connector 165, the mobile device 100 may be connected with an accessory device (e.g. flip cover or speaker).

The keypad 166 may be used to receive user input for controlling the mobile device 100. The keypad 166 may be a virtual keypad (not shown) displayed on the touchscreen 190 or a physical keypad (not shown) formed in the front face of the mobile device 100. The keypad 166 may also be an external keypad (not shown) connected through a wired link or a wireless link based on short-range communication.

The input pen 167 may be pushed into and pulled from the mobile device 100. The input pen 167 may be used to touch (select), handwrite, or draw (paint or sketch) an object (e.g. menu item, text, image, video, figure, icon, or shortcut icon) or a piece of content (e.g. text file, image file, audio file, video file, or webpage) displayed on the touchscreen 190 or an application screen (e.g. memo screen, notepad screen, or calendar screen).

The sensor unit 170 may be used to sense the state of the mobile device 100 or the state of the nearby environment of the mobile device 100. The sensor unit 170 may include one or more sensors. The sensor unit 170 may include a proximity sensor 171 to detect presence of the user in the vicinity of the mobile device 100, an illuminance sensor 172 to sense the amount of light in the vicinity of the mobile device 100, and a gyro sensor 173 to identify the orientation of the mobile device 100 on the basis of the rotational inertia.

The sensor unit 170 may further include an acceleration sensor (not shown), a gravity sensor (not shown), and an altimeter (not shown). The sensor unit 170 may further include a heartbeat sensor (not shown) and a fingerprint sensor (not shown).

A sensor of the sensor unit 170 may sense the state of the mobile device 100 and send a corresponding electrical signal to the control unit 110. It should be readily understood that at least one sensor may be changed in, removed from, or added to the sensor unit 170 according to the performance of the mobile device 100.

The storage unit 175 may store signals or data in relation to operations of the mobile communication unit 120, sub-communication unit 130, multimedia unit 140, camera unit 150, positioning information receiver 155, input/output unit 160, sensor unit 170, and touchscreen 190 under the control of the control unit 110. The storage unit 175 may store control programs for controlling the mobile device 100 or control unit 110, and GUIs, GUI images, user information, documents, databases and data associated with applications provided by the manufacturer or downloaded from the outside.

To indicate wired or wireless power transmission to the accessory apparatus 200, the storage unit 175 may store visual feedback data to be output to the touchscreen 190 (e.g. video source), audible feedback data to be output to the speaker 163 (e.g. sound source), and tactile feedback data to be fed to the vibration motor 164 (e.g. haptic pattern).

The storage unit 175 may store information on the feedback duration time (e.g. 500 ms).

In the description, the words "storage unit" may be used as including the storage unit 175, the ROM 112 or RAM 113 of the control unit 110, or a memory card (e.g. micro secure digital (SD) card or memory stick) installed in the mobile device 100. The storage unit 175 may include a volatile memory, non-volatile memory, hard disk drive (HDD), and solid state drive (SSD).

The power supply unit 180 may supply power to the components 110 to 195 of the mobile device 100 under the control of the control unit 110. Under the control of the control unit 110, the power supply unit 180 may draw power from an external power source (not shown) through a cable connected to the connector 165 and supply power to the components of the mobile device 100. The power supply unit 180 may charge the battery 185 under the control of the control unit 110.

The power supply unit 180 may supply power from the battery 185 to the accessory apparatus 200 through a wired connection using the contacts (not shown). Under the control of the control unit 110, the power supply unit 180 may wirelessly charge the accessory apparatus 200 or the wearable device 300 by use of a transmission coil (181*d* in FIG. 6) linked with the battery 185. Wireless charging may be carried out using magnetic resonance, electromagnetic waves, or electromagnetic induction.

The touchscreen 190 may display GUI windows or screens corresponding to various services provided to the user (e.g. voice call, video call, data transmission, data reception, photographing, video playback, and application execution). The touchscreen 190 may include a touch panel (not shown) for touch input, and a display panel (not shown) for screen display. The touchscreen 190 may further include an edge touch panel (not shown) for touch input, and an edge display panel (not shown) for screen display.

The touchscreen 190 may generate an analog signal corresponding to single-touch input or multi-touch input on the home screen 191 or GUI screen and send the analog signal to the touchscreen controller 195. The touchscreen 190 may sense single-touch input or multi-touch input entered by the body of the user (finger or thumb) or the input pen 167.

The touchscreen controller 195 may convert an analog signal corresponding to single-touch input or multi-touch input received from the touchscreen 190 into a digital signal and send the digital signal to the control unit 110. The control unit 110 may use the digital signal received from the touchscreen controller 195 to extract x and y coordinates of the touch point on the touchscreen 190.

The control unit 110 may use a digital signal received from the touchscreen controller 195 to control the touchscreen 190. For example, the control unit 110 may display a shortcut icon selected by touch input on the touchscreen 190 so that it is distinguished from other shortcut icons, or may execute an application (e.g. phone call) associated with the shortcut icon selected by touch input and display the corresponding screen on the touchscreen 190.

Although the mobile device 100 is described as having one touchscreen in FIGS. 1A, 1B, 2A, and 2B, it may have multiple touchscreens. The individual touchscreens may be respectively arranged in housings and the individual housings may be interconnected with each other via one or more hinges.

Multiple touchscreens may be arranged vertically or horizontally on the front face of the housing. Multiple touchscreens may be implemented using one display panel and multiple touch panels. Multiple touchscreens may be implemented using multiple display panels and one touch panel. Multiple touchscreens may be implemented using multiple display panels and multiple touch panels.

It should be readily understood that at least one component may be added to, removed from, or changed in the mobile device 100 shown in FIG. 1A, 1B, 2A, 2B, or 2C according to the performance thereof.

Referring to FIGS. 1A, 1B, 2A, 2B, and 2C, the accessory apparatus 200 may be mounted on or attached to the mobile device 100. The accessory apparatus 200 may have a mounting structure 202*f* for being mounted on or attached to the mobile device 100. The accessory apparatus 200 attached to the mobile device 100 may wirelessly transmit power to the wearable device 300 in (or out of) contact with the cover (front cover or rear cover) including the wireless power transmitter 281 with a transmission coil.

The accessory apparatus 200 may include a coupling member 203 linking the front cover 201 and the rear cover 202. The mobile device 100 may be placed on one of the front cover 201 and the rear cover 202.

The accessory apparatus 200 may have a wireless power transmitter 281 in either the front cover 201 or the rear cover 202. For example, the wireless power transmitter 281 may be placed between the front outer cover surface 201*a* and the front inner cover surface 201*b* or between the rear inner cover surface 202*a* and the rear outer cover surface 202*b*.

The wireless power transmitter 281 is described in detail later.

Referring to FIGS. 1A, 1B, and 2B, the wearable device 300 may wirelessly draw power (e.g. being charged) from the accessory apparatus 200 in contact therewith.

As shown in FIG. 1A, the remaining power of the battery being charged (e.g. charging level of 65%) may be displayed on the screen of the wearable device 300. As shown FIG. 1B, the remaining power of the battery being charged (e.g. charging level of 56%) may be displayed on the screen of the wearable device 300. When charging is completed, a notification indicating charging completion may be displayed on the screen of the wearable device 300.

The wearable device 300 may use a sensor unit 370 to sense a biometric signal of the user (e.g. heartbeat) and include a mechanism to analyze the state of the user on the basis of biometric information corresponding to the sensed biometric signal.

The wearable device 300 may include a control unit 310, mobile communication unit 320, sub-communication unit 330, multimedia unit 340, camera unit 350, positioning information receiver 355, input/output unit 360, sensor unit 370, storage unit 375, power supply unit 380, wireless power receiver 381, and battery 385. The wearable device 300 may further include a touchscreen 390 and a touchscreen controller 395.

The control unit 310 may include a processor 311. The control unit 310 may further include a ROM 312 to store control programs of the wearable device 300, and a RAM 313 to store signals and data received from the outside and data related with tasks in execution.

The control unit 310 of the wearable device 300 is substantially similar to the control unit 110 of the mobile device 100, and hence a repeated description is omitted.

In various embodiments, the words "control unit" of the wearable device 300 may be used as including the processor 311, ROM 312, and RAM 313.

Under the control of the control unit 310, the mobile communication unit 320 may use one or more antennas to connect to another device (e.g. mobile device, accessory apparatus, or server) though a mobile communication network.

Under the control of the control unit 310, the sub-communication unit 330 may connect to another device (e.g.

mobile device, accessory apparatus, or server) though a WLAN communication module 331 or a short-range communication module 332.

The mobile communication unit 320 and sub-communication unit 330 of the wearable device 300 are substantially similar to the mobile communication unit 120 and sub-communication unit 130 of the mobile device 100, and hence a repeated description is omitted.

In various embodiments, the words "communication unit" of the wearable device 300 may refer to the mobile communication unit 320 and/or the sub-communication unit 330.

The multimedia unit 340 may play back audio data and/or video data under the control of the control unit 310. The multimedia unit 340 may include an audio player 341 and a video player 342.

The multimedia unit 340 of the wearable device 300 is substantially similar to the multimedia unit 140 of the mobile device 100, and hence a repeated description is omitted.

The camera unit 350 may capture a still or moving image under the control of the control unit 310. The camera unit 350 may be placed in one of the front face, the side and the band 300*a* of the wearable device 300. The camera unit 350 may include camera 351 and a supplementary light source (e.g. flash 353) to illuminate a dark scene.

The positioning information receiver 355 may receive signals (e.g. satellite orbit information, time and navigation information) from multiple satellites orbiting the Earth on a periodic basis.

The positioning information receiver 355 of the wearable device 300 is substantially similar to the positioning information receiver 155 of the mobile device 100, and hence a repeated description is omitted.

The input/output unit 360 may include at least one of one or more buttons 361, a microphone 362, a speaker 363, a vibration motor 364, a connector 365, and a keypad 366.

The buttons 361 may be arranged in the front face or the side of the wearable device 300.

The microphone 362 may pick up a voice or sound from the outside and generate a corresponding electrical signal under the control of the control unit 310.

The speaker 363 may output sounds corresponding to various signals (e.g. radio signal, broadcast signal, audio source, video file, and captured image) decoded by the audio codec under the control of the control unit 310.

The vibration motor 364 may convert an electrical signal into mechanical vibration under the control of the control unit 310. The vibration motor 364 may be a linear vibration motor, bar type vibration motor, coin type vibration motor, or piezoelectric element vibration motor.

The connector 365 may be used as an interface for connecting the wearable device 300 with an external device (not shown) or power source (not shown). The connector 365 may be placed in the side or rear face of the wearable device 300.

The keypad 366 may be used to receive user input for controlling the wearable device 300.

The elements 361 to 366 of the input/output unit 360 of the wearable device 300 are substantially similar to the elements 161 to 166 of the input/output unit 160 of the mobile device 100, and hence a repeated description is omitted.

The sensor unit 370 may be used to sense the state of the wearable device 300 or the state of the nearby environment of the wearable device 300. The sensor unit 370 may detect biometric signals of the user. The sensor unit 370 may include a heartbeat sensor 371 to detect the heart rate of the user, an illuminance sensor 372 to sense the amount of light in the vicinity of the wearable device 300, and an acceleration sensor 373 to sense the acceleration of the wearable device 300 along the three axes (x, y and z axes).

It should be readily understood that at least one sensor may be changed in, removed from, or added to the sensor unit 370 according to the performance of the wearable device 300.

The sensor unit 370 of the wearable device 300 is substantially similar to the sensor unit 170 of the mobile device 100, and hence a repeated description is omitted.

The storage unit 375 may store signals or data in relation to operations of the mobile communication unit 320, sub-communication unit 330, multimedia unit 340, camera unit 350, positioning information receiver 355, input/output unit 360, sensor unit 370, and touchscreen 390 under the control of the control unit 310. The storage unit 375 may store control programs for controlling the wearable device 300 or control unit 310, and GUIs, GUI images, user information, documents, databases and data associated with applications provided by the manufacturer or downloaded from the outside.

The storage unit 375 of the wearable device 300 is substantially similar to the storage unit 175 of the mobile device 100, and hence a repeated description is omitted.

In the description, the words "storage unit" of the wearable device 300 may be used as including the storage unit 375, the ROM 312 or RAM 313 of the control unit 310, or a memory card (e.g. micro SD card or memory stick) installed in the wearable device 300. The storage unit of the wearable device 300 may include a volatile memory, non-volatile memory, HDD, and SSD.

The power supply unit 380 may supply power to the components 310 to 395 of the wearable device 300 under the control of the control unit 310. Under the control of the control unit 310, the power supply unit 380 may draw power from an external power source (not shown) through a cable connected to the connector 365 and supply power to the components of the wearable device 300.

The power supply unit 380 may charge the battery 385 under the control of the control unit 310.

Under the control of the control unit 310, the power supply unit 380 may wirelessly charge the battery 385 by use of the wireless power receiver 381. Wireless charging may be carried out using magnetic resonance, electromagnetic waves, or magnetic induction.

The touchscreen 390 may display GUI windows or screens corresponding to various services provided to the user (e.g. biometric information presentation, voice call, video call, data transmission, broadcast reception, photographing, video playback, and application execution). The touchscreen 390 may include a touch panel (not shown) for touch input, and a display panel (not shown) for screen display.

When the touchscreen 390 is a one-piece touchscreen with two curved sides, the touchscreen 390 may include a main display region (not shown) and an edge display region (not shown) at the side. The main display region may be flat or may have a smaller curvature than the edge display region (more flat).

The touchscreen controller 395 may convert an analog signal corresponding to single-touch input or multi-touch input received from the touchscreen 390 into a digital signal and send the digital signal to the control unit 310. The control unit 310 may use the digital signal received from the touchscreen controller 395 to identify x and y coordinates of the touch point on the touchscreen 390.

Although the wearable device 300 is described as having one touchscreen in FIGS. 1A, 1B, and 2B, it may have multiple touchscreens (in one housing).

The wearable device 300 is described as having a flat touchscreen by way of illustration. It is readily understood to those skilled in the art that the wearable device 300 can be configured to have a bendable curved touchscreen.

It should be readily understood that at least one component may be added to, removed from, or changed in the wearable device 300 shown in FIGS. 1A, 1B, and 2B according to the performance thereof.

Figure 3A:
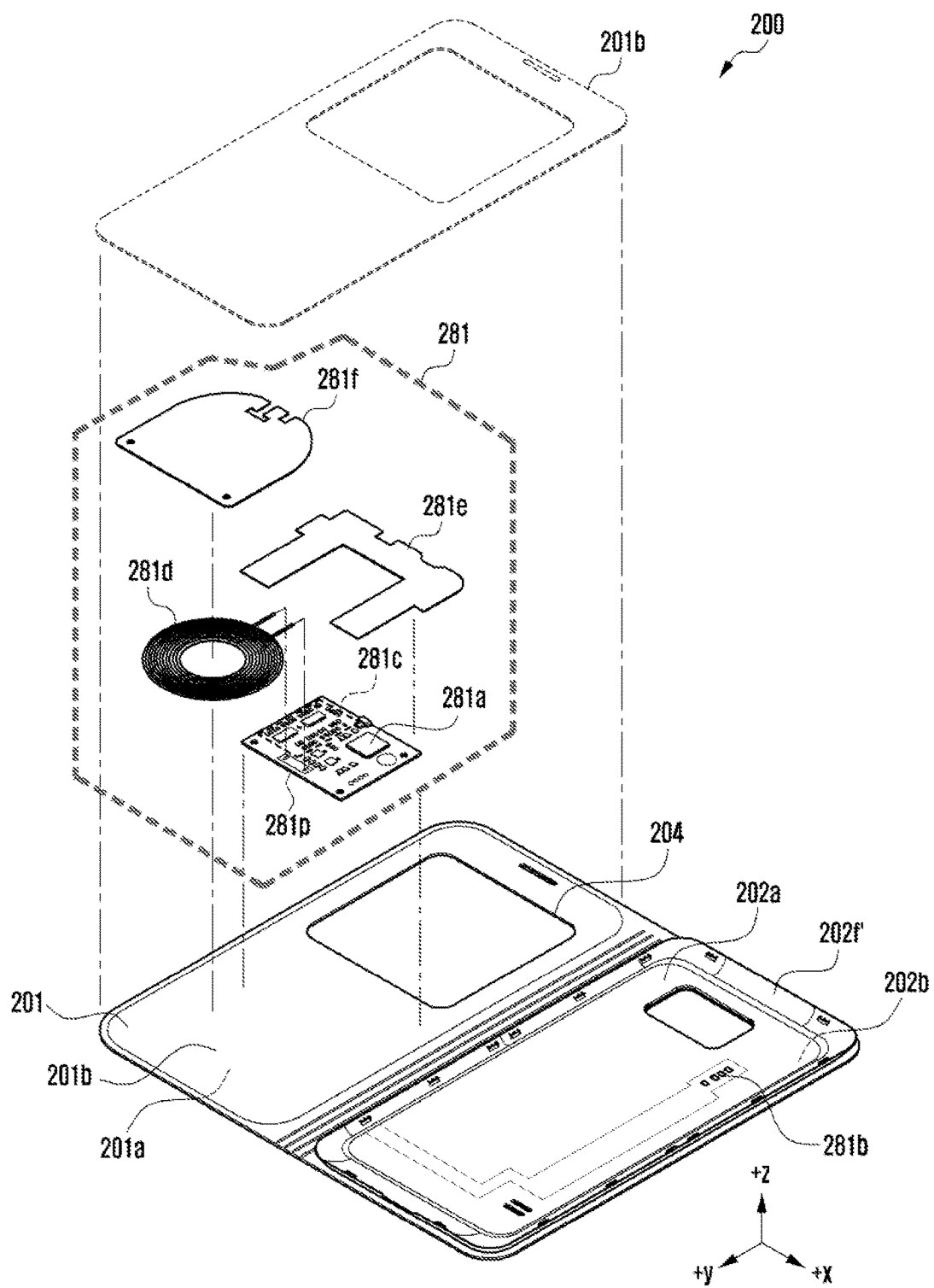
FIG. 3A is a schematic exploded perspective view of an accessory apparatus according to an embodiment of the present disclosure.

FIG. 3A is a schematic exploded perspective view of an accessory apparatus according to an embodiment of the present disclosure.

Figure 3B:
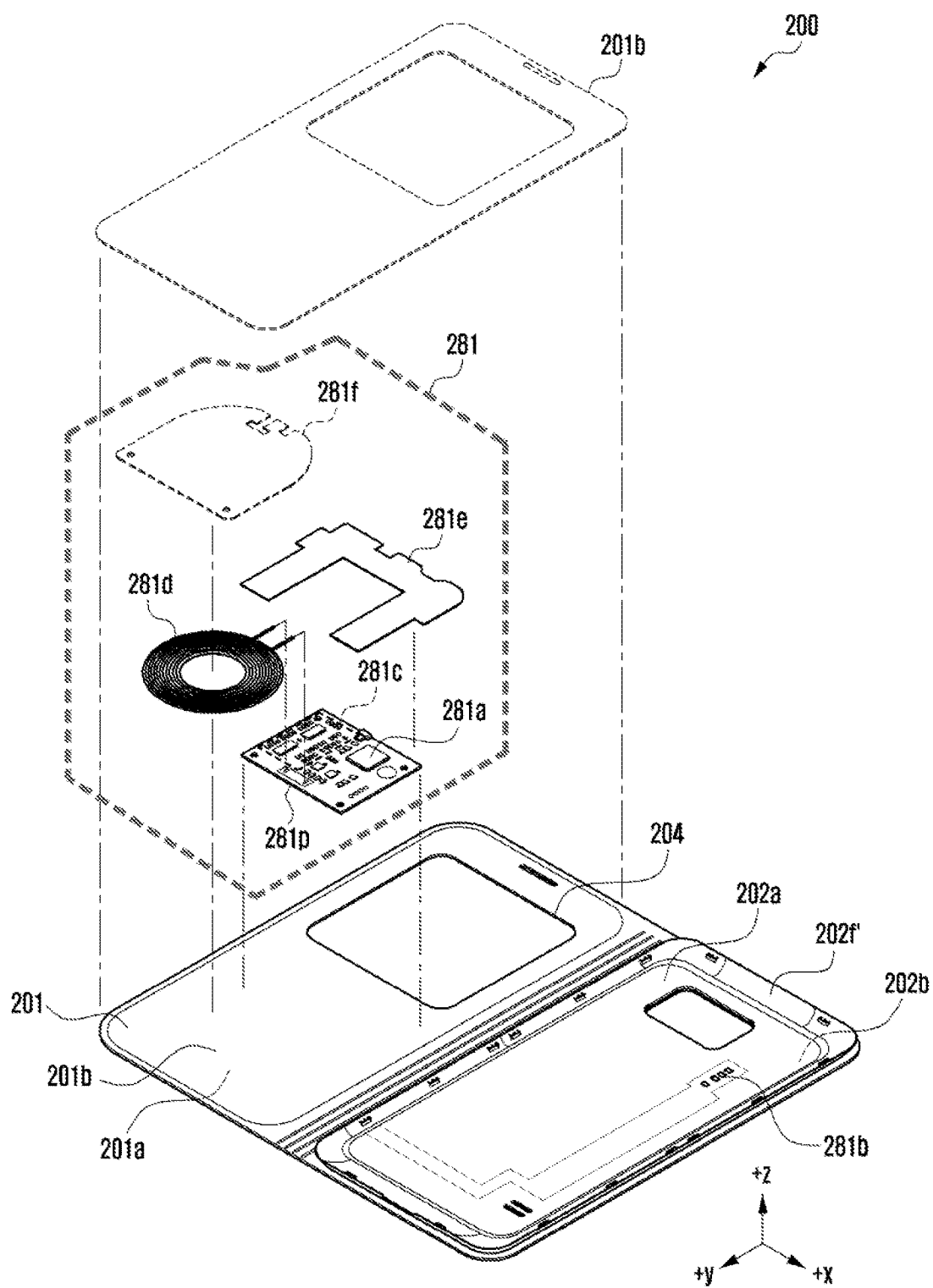
FIG. 3B is a schematic exploded perspective view of an accessory apparatus according to an embodiment of the present disclosure.

FIG. 3B is a schematic exploded perspective view of an accessory apparatus according to an embodiment of the present disclosure.

Referring to FIGS. 1A, 1B, 2C, 3A, and 3B, the wearable device 300 to be charged may be placed on the front cover 201 of the accessory apparatus 200 wiredly connected with the mobile device 100.

In one embodiment, the wireless power transmitter 281 of the accessory apparatus 200 may include a wireless power control processor 281a, a connector 281b, a direct current-alternating current (DC-AC) converter 281c, a transmission coil 281d, a heat dissipation member 281e, and a magnetic shield member 281f.

In an embodiment, the accessory apparatus 200 may include only the transmission coil 281d in the wireless power transmitter. When the accessory apparatus 200 includes the transmission coil 281d only, some elements of the mobile device 100 may take the place of the other elements (281a and 281c) of the wireless power transmitter. For example, the control unit 110 of the mobile device 100 may convert the DC power of the battery 185 into AC power by use of a DC-AC converter (not shown) and wiredly supply the AC power to the accessory apparatus 200 through a connector (not shown), and the accessory apparatus 200 may wirelessly transmit power to the wearable device (or another mobile device) through the transmission coil.

The accessory apparatus 200 may be mounted on or attached to the mobile device 100. The mounting structure 202f of the accessory apparatus 200 may be used for mounting on or attachment to the mobile device 100. Upon mounting, the connector 281b of the accessory apparatus 200 may be brought into contact with the contacts (not shown) of the mobile device 100. The mobile device 100 may wiredly transmit power from the battery 185 to the accessory apparatus 200 through the contacts and the connector 281b. Here, the battery 185 supplies DC power to the accessory apparatus 200.

In one embodiment, the wireless power control processor 281a may control the wireless power transmitter 281 to wirelessly transmit power to the accessory apparatus 200. To this end, the wireless power control processor 281a may control at least one of the connector 281b, DC-AC converter 281c, and transmission coil 281d.

The wireless power control processor 281a may detect the wearable device 300 placed on the front cover surface 201 of the accessory apparatus 200. For example, in standby state, the wireless power control processor 281a may send an analog ping to detect presence of an object, and send a digital ping to identify a target to be charged (e.g. wearable device 300). In one embodiment, an analog ping may be sent on a periodic basis of, for example, 500 ms. A digital ping may be sent using a preset frequency of, for example, 175 kHz.

The accessory apparatus 200 wiredly connected with the mobile device 100 may use the wireless power transmitter 281 (wireless power control processor 281a) to wirelessly transmit power to the wearable device 300.

The wireless power transmitter 281 may include an over-voltage protection (OVP) circuit (not shown). When power with a voltage higher than a preset threshold is supplied from an external power source, the OVP circuit may separate the internal circuit from the external power source.

In an embodiment, the power of the battery 185 may be transmitted to the accessory apparatus 200 in the form of AC power. When AC power is supplied to the accessory apparatus 200, the DC-AC converter 281c may be omitted from the accessory apparatus 200.

The DC-AC converter 281c may convert DC power supplied through the connector 281b into AC power. The DC-AC converter 281c may be realized as an integrated circuit (IC) chip or DC-AC conversion circuit.

AC power from the DC-AC converter 281c may be wirelessly transmitted through magnetic fields formed between the transmission coil 281d and the reception coil 381e. Changes in magnetic flux caused by the current fed to the transmission coil 281d induces a current in the reception coil 381e. Power may be wirelessly transmitted through interactions between the coils 281d and 381e. According to the Wireless Power Consortium (WPC) standard for wireless charging, a frequency range between 110 kHz and 205 kHz may be used for power transmission. According to the Power Matters Alliance (PMA) standard for wireless charging, a frequency range between 277 kHz and 357 kHz may be used for power transmission.

The wireless power control processor 281a and the DC-AC converter 281c may be mounted on a printed circuit board 281p. In addition to the wireless power control processor 281a and the DC-AC converter 281c, other parts for wireless power transmission may be mounted on the printed circuit board 281p.

The transmission coil 281d may be of various shapes including a circle. AC power from the DC-AC converter 281c causes a current to flow through the transmission coil 281d. Changes in the flow of current generate magnetic fields around the transmission coil 281d, and the magnetic fields induce an electromotive force (voltage) in a nearby reception coil (e.g. reception coil 381e of the wearable device 300). This induced electromotive force enables wireless power transmission to the wearable device 300 connected with the reception coil (e.g. reception coil 381e).

The transmission coil 281d may include a matching circuit composed of an inductor (L) and a capacitor (C) to match a frequency suitable for wireless power transmission.

The transmission coil 281d may be one of WPC transmitter coils. For example, the transmission coil 281d may be of a circle, oval, or polygon with rounded corners (triangle, quadrangle, or the like).

The transmission coil 281d may be a single coil or a group of coils. When the transmission coil 281d is a group of coils, the individual coils may partially overlap each other. When the transmission coil 281d is a group of coils, the wireless power control processor 281a may change the level of wirelessly transmitted power according to the information on the accessory apparatus 200 (e.g. maximum power and remaining battery power).

The heat dissipation member 281e may dissipate heat generated by the printed circuit board 281p during wireless power transmission. The heat dissipation member 281e may have a shape corresponding to that of the printed circuit board 281p.

The heat dissipation member 281e may be placed above or under the printed circuit board 281p.

The heat dissipation member 281e may be of a shape rapidly dissipating heat like a sheet or film. The heat dissipation member 281e may be made of various materials rapidly dissipating heat, such as a graphite sheet, copper sheet, thermal interface material (TIM), heat pipe, and graphene.

The magnetic shield member 281f may prevent magnetic fields generated by the transmission coil 281d from affecting the surroundings. The magnetic shield member 281f may enhance the performance of charging. The magnetic shield member 281f may be made of, for example, ferrite.

The magnetic shield member 281f may be placed above or under the transmission coil 281d in accordance with the direction of wireless power transmission. For example, when the direction of wireless power transmission is toward the front outer cover surface 201a of the accessory apparatus 200 (e.g. positive z-axis direction in FIG. 3A), the magnetic shield member 281f may be placed under the transmission coil 281d. When the direction of wireless power transmission is toward the front inner cover surface 201b of the accessory apparatus 200 (e.g. negative z-axis direction in FIG. 3A), the magnetic shield member 281f may be placed above the transmission coil 281d.

The front inner cover surface 201b of the accessory apparatus 200 may be arranged so that the wireless power control processor 281a, DC-AC converter 281c, transmission coil 281d, heat dissipation member 281e, and magnetic shield member 281f are not exposed to the outside. The front inner cover surface 201b of the accessory apparatus 200 may be arranged so that power lines (not shown) between the printed circuit board 281p and the connector 281b are not exposed to the outside.

The configuration of the accessory apparatus 200 shown in FIG. 3B is substantially identical to that shown in FIG. 3A except for the magnetic shield member 281f.

When the direction of wireless power transmission is toward both the front cover surfaces 201a and 201b of the accessory apparatus 200 (e.g. positive and negative z-axis directions), the magnetic shield member 281f may be omitted from the accessory apparatus 200. That is, when neither the front inner cover surface 201b nor the front outer cover surface 201a includes the magnetic shield member 281f, the accessory apparatus 200 may wirelessly transmit power to the wearable device 300 placed on the front inner cover surface 201b or the front outer cover surface 201a.

When the wearable device 300 placed on the front inner cover surface 201b is wirelessly charged as shown in FIG. 1B, the mobile device 100 may not only supply power for wireless charging but also provide a service (e.g. music playback) to the user (i.e. multitasking).

According to various embodiments of the present disclosure, an accessory apparatus includes a front cover, a rear cover to accommodate a mobile device, and a coupling member linking the front cover and the rear cover together. The accessory apparatus may further include a wireless power control processor, a connector to electrically connect the accessory apparatus to the mobile device, a DC-AC converter to convert DC power from the connector into AC power, and a transmission coil to wirelessly transmit power through magnetic fields generated by the AC power. The wireless power control processor, DC-AC converter, and transmission coil may be arranged in the front cover.

In one embodiment, the transmission coil is further arranged in the front cover to wirelessly transmit the magnetic fields towards the external device. The transmission coil may be further arranged to wirelessly transmit the magnetic fields towards the external device through at least one of an outside of the front cover or an inside of the front cover.

In one embodiment, the connector may be electrically connected with the battery of the mobile device and may be placed in the rear cover. The connector may also be electrically connected to a complementary connector of the mobile device when the rear cover accommodates the mobile device.

In one embodiment, the connector may be electrically connected with a complementary connector of the mobile device and may be rotated at a preset angle relative to the rear cover for being connected with the connector of the mobile device when the rear cover does not accommodate the mobile device and when the rear cover accommodates the mobile device.

In one embodiment, the front cover may include a transparent region, and at least one of the wireless power control processor, DC-AC converter, or transmission coil may be arranged in a region other than the transparent region.

In one embodiment, the accessory apparatus may further include a magnetic shield member in the front cover, and the magnetic shield member may be placed adjacent (e.g., above or under) the transmission coil in accordance with the direction of wireless power transmission.

When the direction of wireless power transmission is toward the outside of the front cover, the magnetic shield member may be placed under the transmission coil. When the direction of wireless power transmission is toward the inside of the front cover, the magnetic shield member may be placed above the transmission coil.

In one embodiment, the accessory apparatus may further include a printed circuit board in the front cover. The wireless power control processor and DC-AC converter may be mounted on the printed circuit board.

In one embodiment, the accessory apparatus may further include a heat dissipation member in the front cover. The heat dissipation member may dissipate heat generated by the printed circuit board.

According to various embodiments of the present disclosure, an accessory apparatus may include: a housing configured to at least partially cover one face of a mobile device and have a substantially flat region, a mounting structure placed at one face of the housing and configured to be removably mounted on the mobile device, a connector placed on the one face of the housing and configured to draw power from the mobile device, a wireless charging transmitter circuit electrically connected with the connector and placed in the housing, and a conductive pattern at least partially included in the substantially flat region, the conductive pattern electrically connected with the wireless charging transmitter circuit.

In one embodiment, the accessory apparatus may further include a control circuit that is configured to receive a signal from the mobile device and control the wireless charging transmitter circuit in response to the signal.

In one embodiment, the substantially flat region is large enough to at least partially cover a display unit of the mobile device.

The mounting structure of the accessory apparatus may include a magnetic object or magnetic substance attachable to or attracted by a magnetic object or magnet arranged in one side of the external housing of the mobile device.

In the description, the accessory apparatus 200 refers to a device that is mountable on (attachable to) the mobile device 100 and can draw power from the mobile device 100 through a wired connection. The configuration (size or shape) of the accessory apparatus 200 is for illustration only. It should be readily understood that there may be various changes and modifications in the configuration of the accessory apparatus 200.

It will be readily understood that at least one component may be added to (e.g. battery to temporarily store received power, capacitor, or sensor), removed from (e.g. heat dissipation member), or changed in the accessory apparatus 200 shown in FIGS. 1A, 1B, 2A, 2B, 2C, 3A, and 3B according to the performance of the mobile device 100.

In one embodiment, referring to FIGS. 1A, 1B, 2C, and 3A, the wireless power receiver 381 of the wearable device 300 may wirelessly receive power from the wireless power transmitter 281 of the accessory apparatus 200.

The wireless power receiver 381 of the wearable device 300 may include a wireless power control processor 381a, regulator 381c, AC-DC converter 381d, and reception coil 381e. The wireless power receiver 381 may include an OVP circuit (not shown). The wireless power receiver 381 may further include at least one of a heat dissipation member (not shown) and a magnetic shield member (not shown).

The wireless power control processor 381a may control the AC-DC converter 381d to convert AC power from the reception coil 381e into DC power. The voltage of the DC power may be adjusted by the regulator 381c to a voltage suitable for charging the battery 385 (e.g. 5 V). The regulator 381c and the wireless power control processor 381a may be implemented as a single entity or different entities.

The wireless power control processor 381a may control supply of power (or voltage) to the battery 385. For example, the wireless power control processor 381a may control the regulator 381c to supply adjusted power (or voltage) to the battery 385.

Figure 4A:
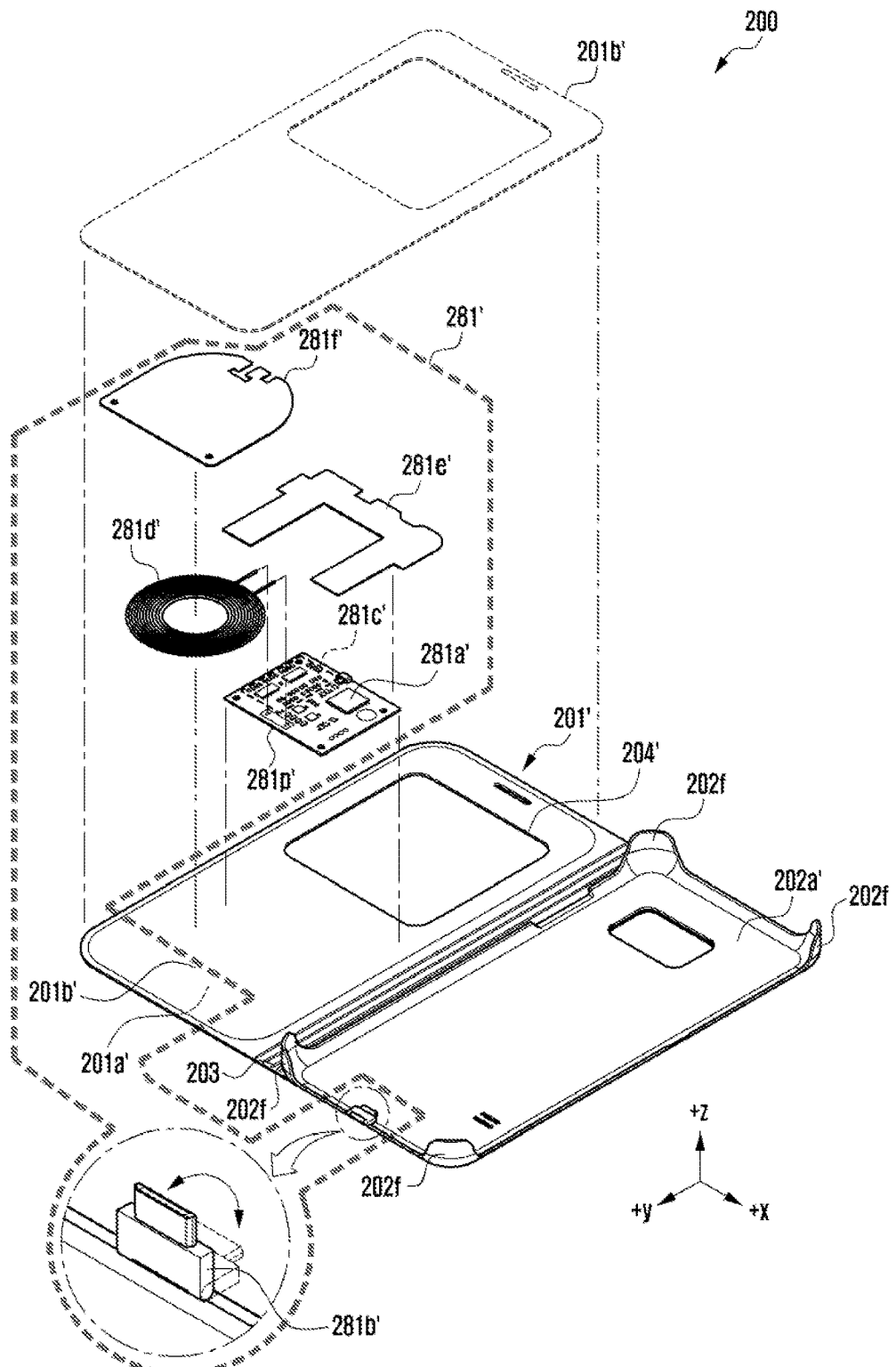
FIG. 4A is a schematic exploded perspective view of an accessory apparatus according to an embodiment of the present disclosure.

FIG. 4A is a schematic exploded perspective view of an accessory apparatus according to an embodiment of the present disclosure.

Figure 4B:
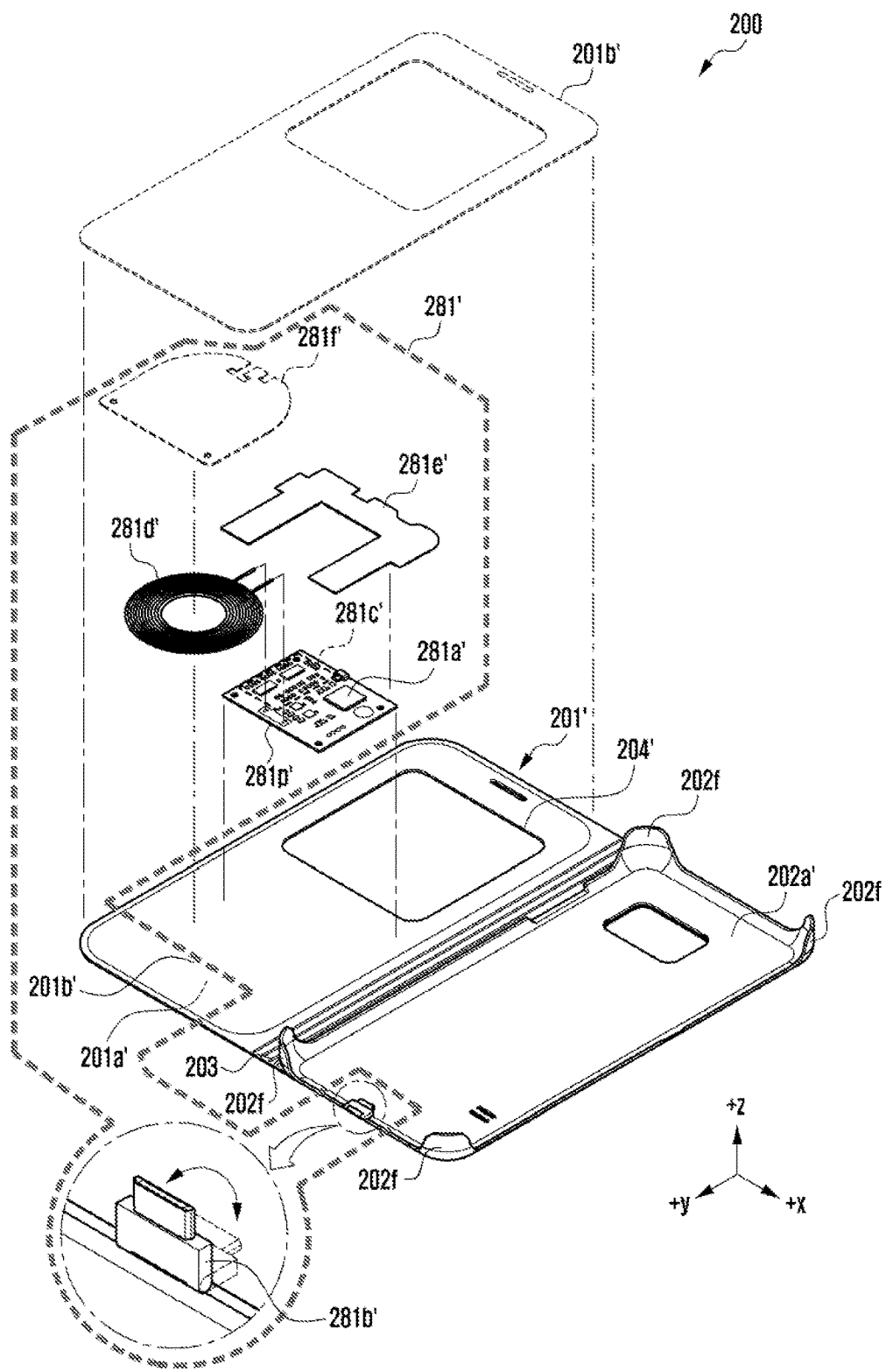
FIG. 4B is a schematic exploded perspective view of an accessory apparatus according to an embodiment of the present disclosure.

FIG. 4B is a schematic exploded perspective view of an accessory apparatus according to an embodiment of the present disclosure.

Referring to FIG. 4A, the wireless power transmitter 281' of the accessory apparatus 200 may include a wireless power control processor 281a', a connector 281b', a DC-AC converter 281c', and a transmission coil 281d'. The wireless power transmitter 281' may further include a heat dissipation member 281e', and a magnetic shield member 281f.

In one embodiment, the accessory apparatus 200 may use the mounting structure 202f for being mounted on or attached to the mobile device 100. The accessory apparatus 200 may be connected with the connector 165 of the mobile device 100 by use of the connector 281b'. The accessory apparatus 200 may draw power from the battery 185 of the mobile device 100 through the connector 281b' and the connector 165.

Like the accessory apparatus 200 shown in FIGS. 3A and 3B, the accessory apparatus 200 in FIG. 4A may include a front cover 201, a rear cover 202, and a coupling member 203 linking the front cover 201 and the rear cover 202.

The connector 281b' connectable to the connector 165 of the mobile device 100 may be rotated. Upon mounting on (or attachment to) the mobile device 100, the connector 281b' may be rotated at a preset angle (e.g. 85 degrees) relative to the rear inner cover surface 202a. For example, the preset angle may be between 10 degrees and 60 degrees. The preset angle may be between 5 degrees and 95 degrees.

It will be readily understood that the angle set for the connector 281b' may change according to the structure or size of the accessory apparatus 200.

The power of the battery 185 of the mobile device 100 may be transmitted to the accessory apparatus 200 in the form of DC power.

The DC-AC converter 281c' may convert DC power supplied through the connector 281b' into AC power.

AC power from the DC-AC converter 281c' may be wirelessly transmitted to the wearable device 300 through magnetic fields formed between the transmission coil 281d' and the reception coil 381e.

The wireless power control processor 281a' and the DC-AC converter 281c' may be mounted on a printed circuit board 281p'. In addition to the wireless power control processor 281a' and the DC-AC converter 281c', other parts for wireless power transmission may be mounted on the printed circuit board 281p'.

The transmission coil 281d' may be of various shapes including a circle. AC power from the DC-AC converter 281c' flows through the transmission coil 281d'.

The heat dissipation member 281e' may dissipate heat generated by the printed circuit board 281p' during wireless power transmission.

The magnetic shield member 281f may prevent magnetic fields generated by the transmission coil 281d' from affecting the surroundings.

In an embodiment, the accessory apparatus 200 may include only the transmission coil 281d' in the wireless power transmitter. When the accessory apparatus 200 includes the transmission coil 281d' only, some elements of the mobile device 100 may take the place of the other elements (281a' and 281c') of the wireless power transmitter. For example, the control unit 110 of the mobile device 100 may convert the DC power of the battery 185 into AC power by use of a DC-AC converter (not shown) and wiredly supply the AC power to the accessory apparatus 200 through a connector (not shown), and the accessory apparatus 200 may wirelessly transmit power to the wearable device (or another mobile device) through the transmission coil 281d'.

The elements (281a', 281c' to 281f) of the wireless power transmitter 281' in FIG. 4A excluding the connector 281b' are substantially similar to the corresponding elements (281a, 281c to 281f) of the wireless power transmitter 281 in FIG. 3A excluding the connector 281b, and thus a repeated description thereof is omitted.

Referring to FIG. 4B, the elements (281a' to 281e') of the accessory apparatus 200 may be substantially identical to the corresponding elements (281a' to 281e') of the accessory apparatus 200 in FIG. 4A excluding the magnetic shield member 281f.

When the magnetic shield member 281f is not included in the front cover surfaces 201b' and 201a', the accessory apparatus 200 may wirelessly transmit power in two directions (e.g. positive or negative z-axis direction). In other words, when neither the front inner cover surface 201b' nor the front outer cover surface 201a' includes the magnetic shield member 281f, the accessory apparatus 200 may wirelessly transmit power to the wearable device 300 placed on the front inner cover surface 201b' or the front outer cover surface 201a'.

When the wearable device 300 placed on the front inner cover surface 201b' is wirelessly charged as shown in FIG. 1B, the mobile device 100 may not only supply power for wireless charging but also provide a service (e.g. music playback) to the user (i.e. multitasking).

According to various embodiments of the present disclosure, an accessory apparatus may include: a first cover to cover or expose the front face of a mobile device, a second cover having a space to accommodate the mobile device, a coupling member to link the first cover and the second cover, and a wireless power transmitter circuit placed in the first cover and configured to wirelessly transmit power through magnetic fields generated by AC power that is obtained via DC-AC conversion from DC power of a battery of the mobile device accommodated in the second cover.

In one embodiment, the wireless power transmitter circuit may include a wireless power control processor, a connector electrically connected with the battery of the mobile device, a DC-AC converter to convert DC power from the connector into AC power, and a transmission coil to wirelessly transmit power to an external reception coil through magnetic fields generated by the AC power.

Operations of the accessory apparatus 200 shown in FIG. 4B are substantially identical to those of the accessory apparatus 200 shown in FIG. 4A, and thus a repeated description thereof is omitted.

Figure 5A:
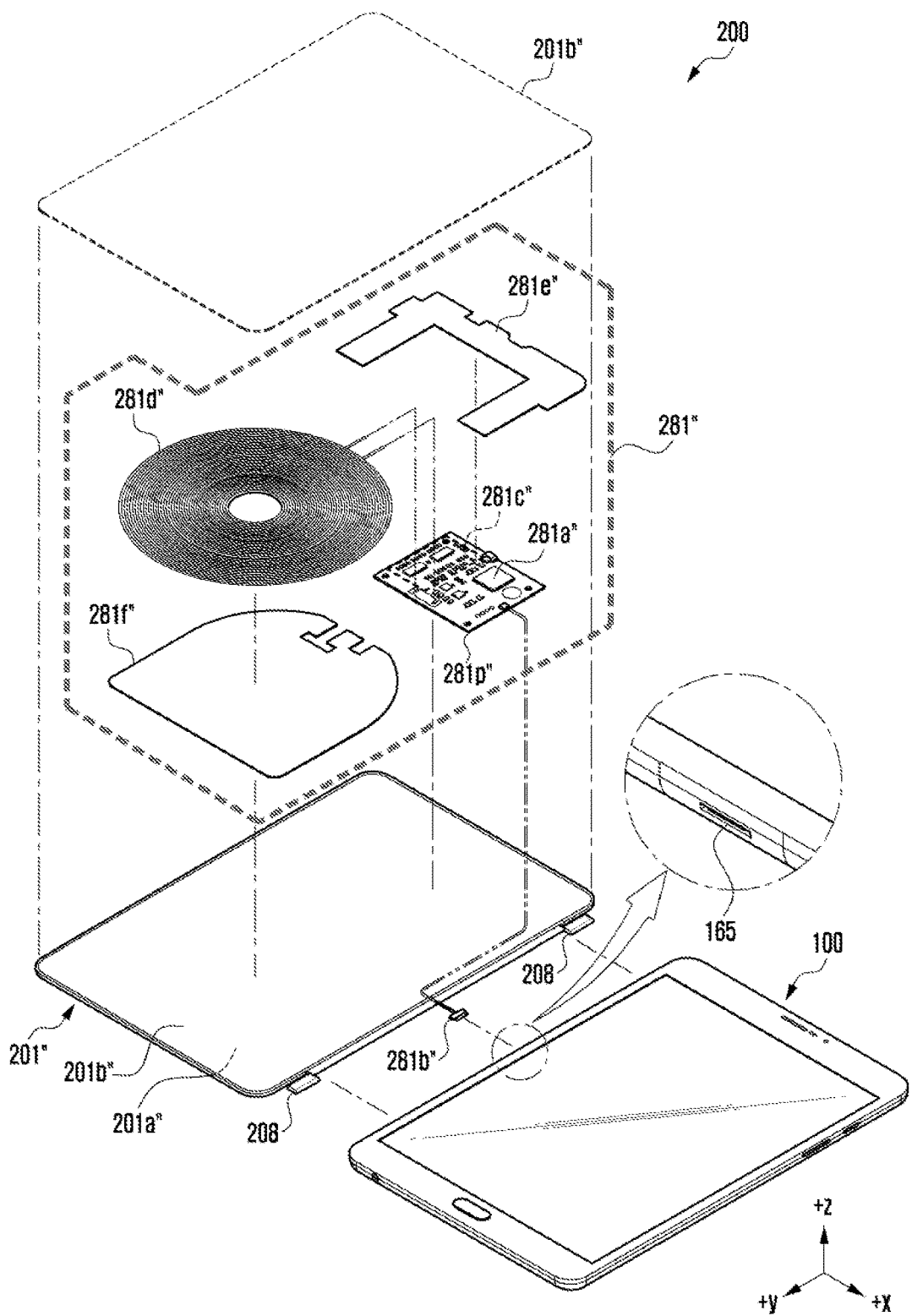
FIG. 5A is a schematic exploded perspective view of an accessory apparatus according to an embodiment of the present disclosure.

FIG. 5A is a schematic exploded perspective view of an accessory apparatus according to an embodiment of the present disclosure.

Figure 5B:
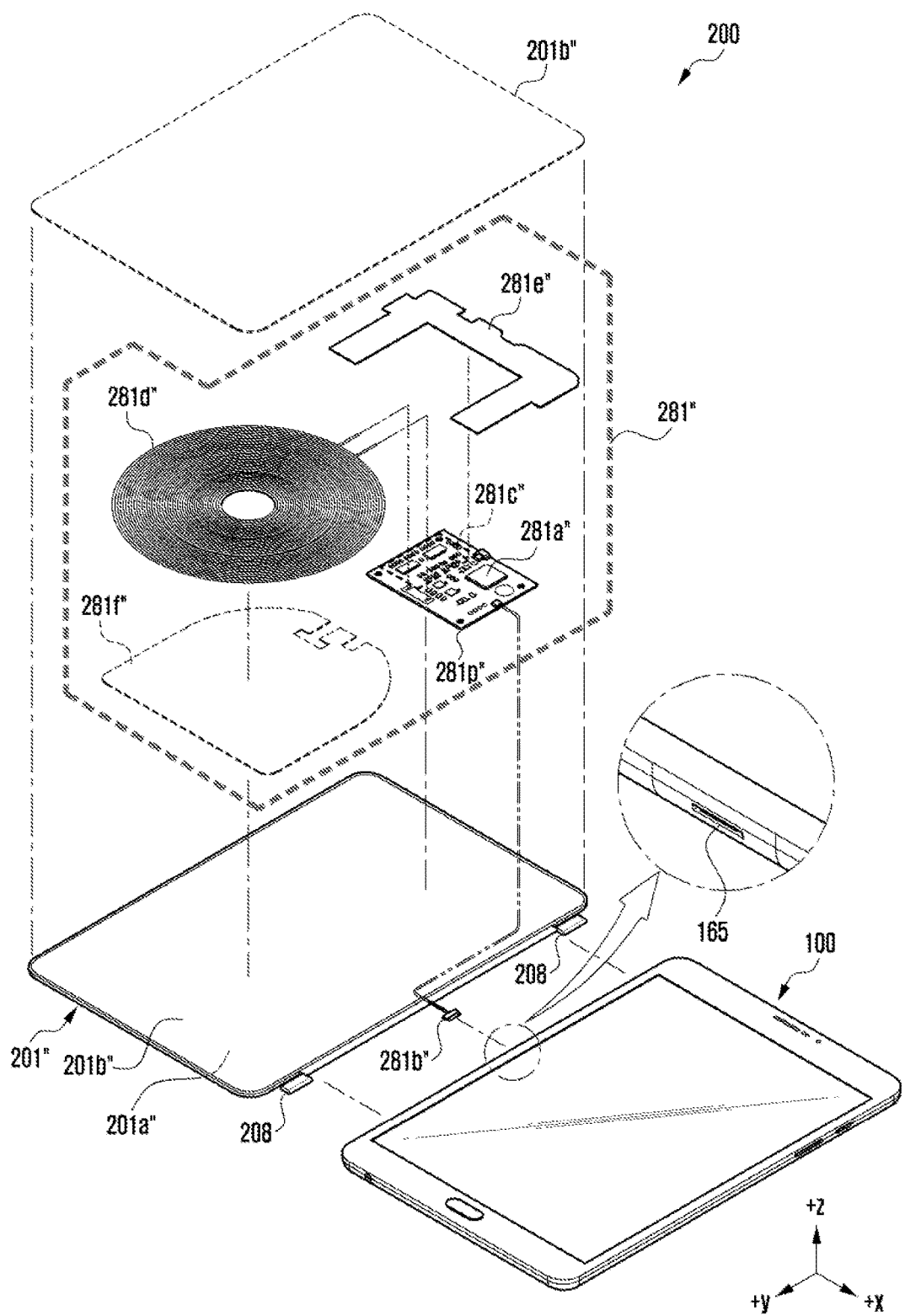
FIG. 5B is a schematic exploded perspective view of an accessory apparatus according to an embodiment of the present disclosure.

FIG. 5B is a schematic exploded perspective view of an accessory apparatus according to an embodiment of the present disclosure.

Referring to FIG. 5A, the wireless power transmitter 281" of the accessory apparatus 200 may include a wireless power control processor 281a", a connector 281b", a DC-AC converter 281c", and a transmission coil 281d". The wireless power transmitter 281" may further include a heat dissipation member 281e", and a magnetic shield member 281f".

The accessory apparatus 200 may be connected with the connector 165 of the mobile device 100 by use of the connector 281b". The accessory apparatus 200 may draw power from the battery 185 of the mobile device 100 through the connector 281b" and the connector 165.

Unlike the accessory apparatus 200 of FIG. 3A, the accessory apparatus 200 of FIG. 5A may include a coupling member 208 that is configured to detachably link the front cover 201" of the accessory apparatus 200 to one side of the mobile device 100. The coupling member 208 may be referred to as a mounting structure. The coupling member 208 of the accessory apparatus 200 may include a magnetic object or magnetic substance attachable to or attracted by a magnetic object or magnet arranged in one side (e.g. side or rear face) of the external housing of the mobile device 100.

The coupling member 208 may include a magnet or vacuum absorber using air pressure. The coupling member 208 may be rotated relative to the front cover 201". Rotation of the coupling member 208 may cause the front cover 201" to cover or expose the screen of the mobile device 100.

The connector 281b" connectable with the connector 165 of the mobile device 100 may protrude from the side of the accessory apparatus 200 by using a cable of a given length. For example, according to attachment to (or detachment from) the mobile device 100, the connector 281b" may protrude by a preset length (e.g. 10 mm or less) from the side of the accessory apparatus 200. The protruding length of the connector 281b" may be set so as not to cause interference to coupling between the coupling member 208 and the side of the mobile device 100.

The connector 281b" may have a shape of a pogo pin in accordance with the connector 165 of the mobile device 100.

For example, the connector 281b" may have a shape of a magnetic pogo pin in accordance with the connector 165 of the mobile device 100.

It will be readily understood that the protruding length of the connector 281b" may change according to the structure or size of the accessory apparatus 200. It will also be readily understood that the protruding length of the connector 281b" may change according to the structure or size of the connector 281b".

The wireless power transmitter 281" of the accessory apparatus 200 may include a wireless power control processor 281a", the connector 281b", a DC-AC converter 281c", a transmission coil 281d", a heat dissipation member 281e", and a magnetic shield member 281f".

The DC-AC converter 281c" may convert DC power supplied through the connector 281b" into AC power. AC power from the DC-AC converter 281c" may be wirelessly transmitted to the wearable device 300 through magnetic fields formed between the transmission coil 281d" and the reception coil 381e.

The wireless power control processor 281a" and the DC-AC converter 281c" may be mounted on a printed circuit board 281p". In addition to the wireless power control processor 281a" and the DC-AC converter 281c", other parts for wireless power transmission may be mounted on the printed circuit board 281p".

The transmission coil 281d" may be of various shapes including a circle. AC power from the DC-AC converter 281c" flows through the transmission coil 281d".

The heat dissipation member 281e" may dissipate heat generated by the printed circuit board 281p" during wireless power transmission.

The magnetic shield member 281f" may prevent magnetic fields generated by the transmission coil 281d" from affecting the surroundings.

In an embodiment, the accessory apparatus 200 may include only the transmission coil 281d" in the wireless power transmitter. When the accessory apparatus 200 includes the transmission coil 281d" only, some elements of the mobile device 100 may take the place of the other elements (281a" to 281c") of the wireless power transmitter. For example, the control unit 110 of the mobile device 100 may convert the DC power of the battery 185 into AC power by use of a DC-AC converter (not shown) and wiredly supply the AC power to the accessory apparatus 200 through a connector (not shown), and the accessory apparatus 200 may wirelessly transmit power to the wearable device (or another mobile device) through the transmission coil 281d".

The elements (281a", 281c" to 281f") of the wireless power transmitter 281" in FIG. 5A excluding the connector 281b" are substantially similar to the corresponding elements (281a, 281c to 281f) of the wireless power transmitter 281 in FIG. 3A excluding the connector 281b, and thus a repeated description thereof is omitted.

Referring to FIG. 5B, the elements (281a" to 281e") of the accessory apparatus 200 may be substantially identical to the corresponding elements (281a" to 281e") of the accessory apparatus 200 in FIG. 5A excluding the magnetic shield member 281f".

When the magnetic shield member 281r is not included in the front cover surfaces 201b" and 201a", the accessory apparatus 200 may wirelessly transmit power in two directions (e.g. positive or negative z-axis direction). In other words, when neither the front inner cover surface 201b" nor the front outer cover surface 201a" includes the magnetic shield member 281f", the accessory apparatus 200 may wirelessly transmit power to the wearable device 300 placed on the front inner cover surface 201b″ or the front outer cover surface 201a″.

When the wearable device 300 placed on the front inner cover surface 201b″ is wirelessly charged as shown in FIG. 1B, the mobile device 100 may not only supply power for wireless charging but also provide a service (e.g. music playback) to the user (i.e. multitasking).

Operations of the accessory apparatus 200 shown in FIG. 5B are substantially identical to those of the accessory apparatus 200 shown in FIG. 5A, and thus a repeated description thereof is omitted.

Figure 6:
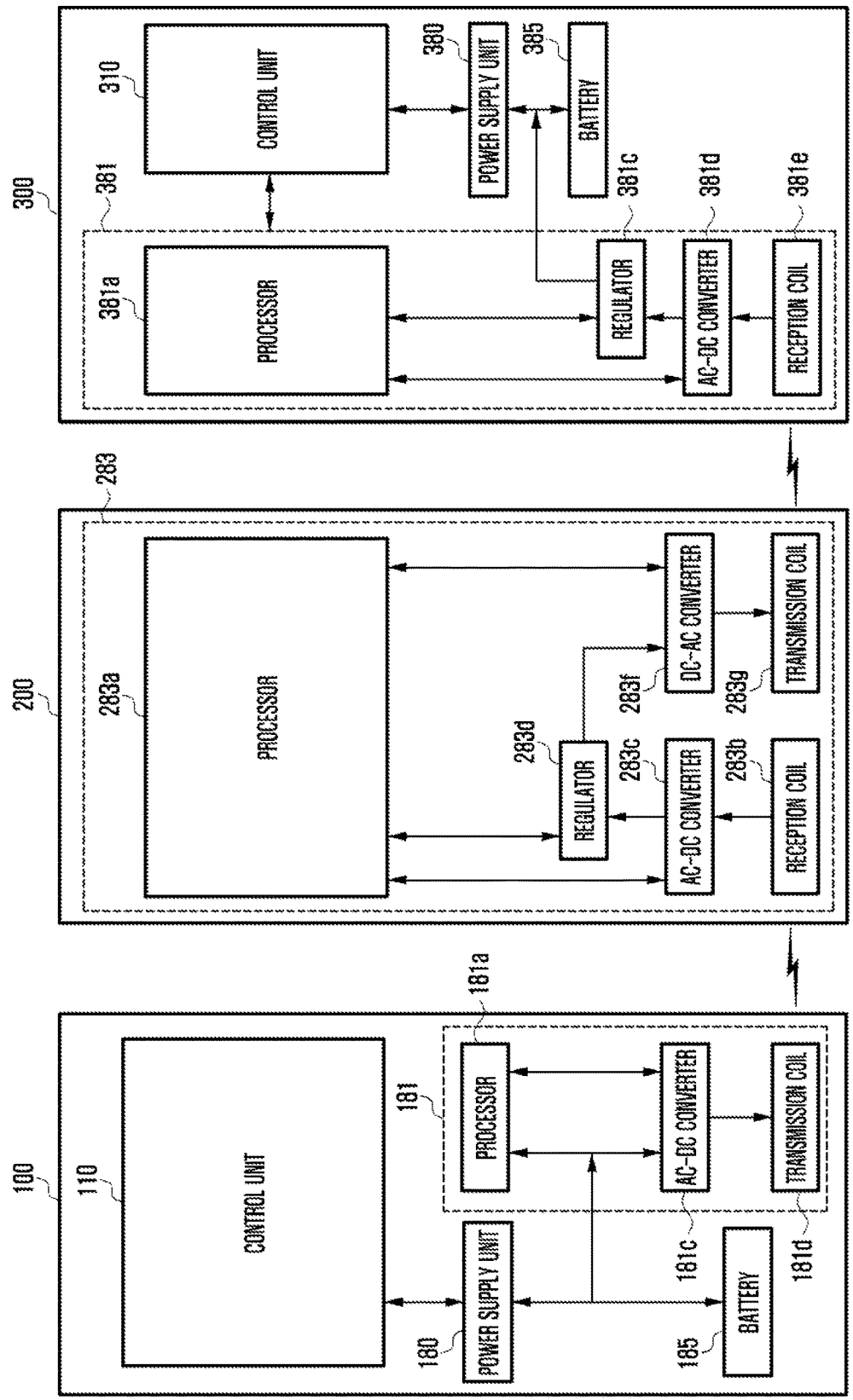
FIG. 6 is a schematic block diagram of a mobile device, accessory apparatus, and wearable device according to an embodiment of the present disclosure.

FIG. 6 is a schematic block diagram of a mobile device, accessory apparatus, and wearable device according to an embodiment of the present disclosure.

Figure 7A:
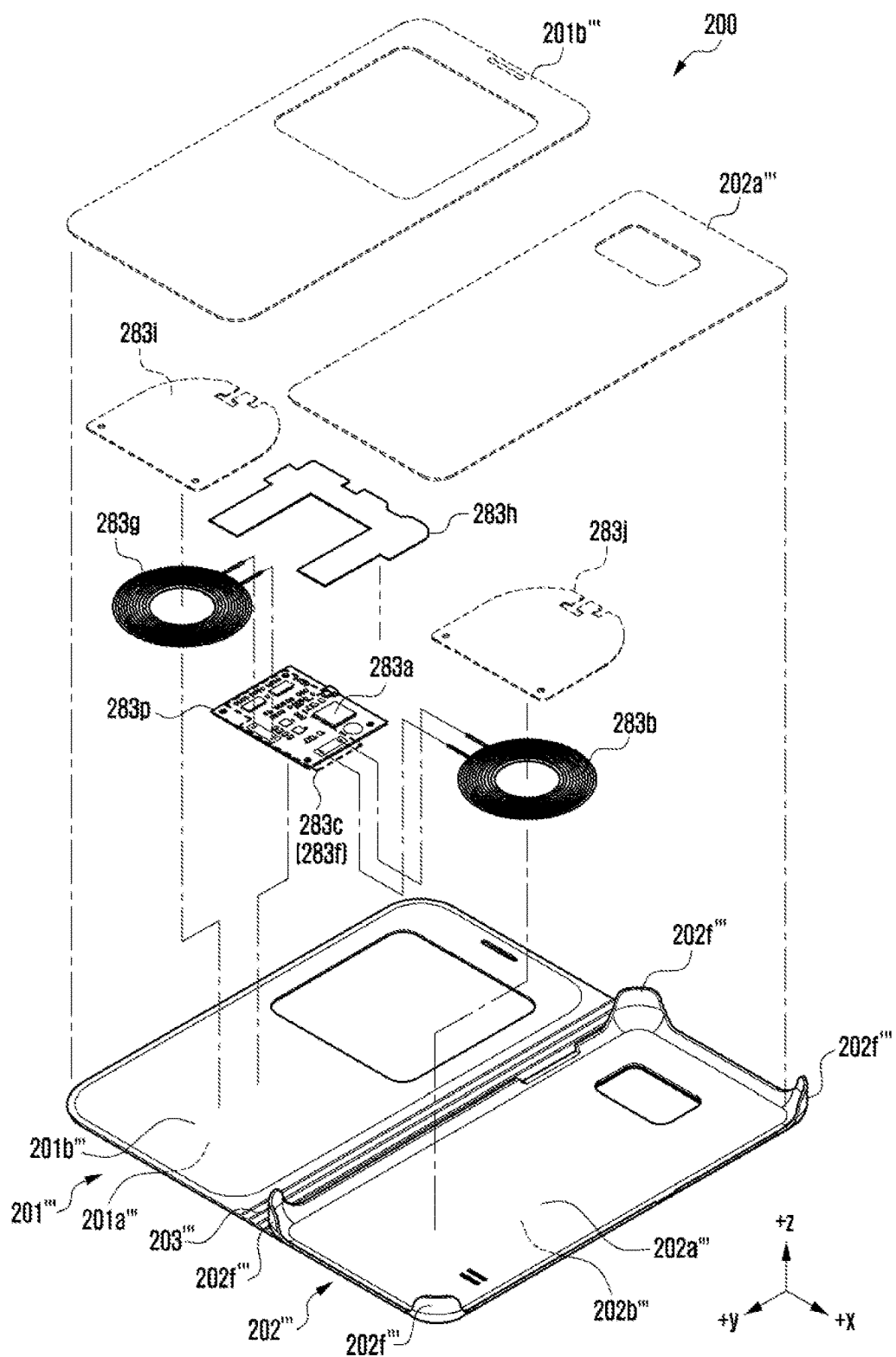
FIG. 7A is a schematic exploded perspective view of an accessory apparatus according to an embodiment of the present disclosure.

FIG. 7A is a schematic exploded perspective view of an accessory apparatus according to an embodiment of the present disclosure.

Figure 7B:
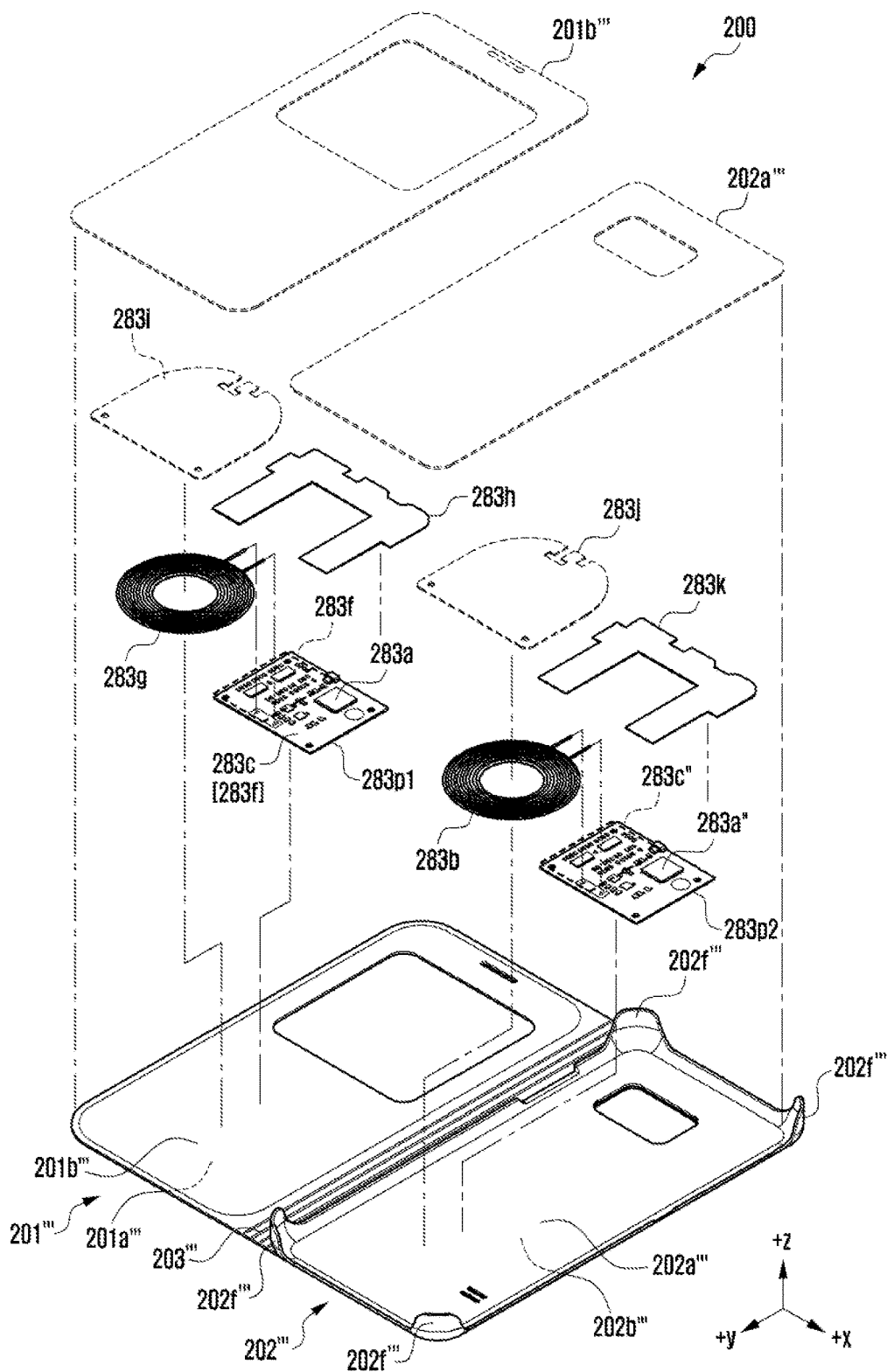
FIG. 7B is a schematic exploded perspective view of an accessory apparatus according to an embodiment of the present disclosure.

FIG. 7B is a schematic exploded perspective view of an accessory apparatus according to an embodiment of the present disclosure.

Referring to FIGS. 6 and 7A, the accessory apparatus 200 may use the mounting structure 202f‴ for being mounted on or attached to the mobile device 100. Unlike the case of FIG. 2C, the accessory apparatus 200 may wirelessly draw power from the mobile device 100. A wearable device 300 to be charged may be placed on the front cover (201a‴ and 201b‴) of the accessory apparatus 200.

The wireless power transceiver 181 of the mobile device 100 in FIG. 6 is substantially similar to the wireless power transmitter 281 of the accessory apparatus 200 in FIG. 2C.

In one embodiment, the wireless power transceiver 181 of the mobile device 100 may include a wireless power control processor 181a, an AC-DC converter 181c, and a transceiver coil 181d. The wireless power transceiver 181 may further include a heat dissipation member (not shown) and a magnetic shield member (not shown).

The wireless power transceiver 181 may adjust the time constant of the AC-DC converter 181c so that it operates as a DC-AC converter. The wireless power transceiver 181 may cause the transceiver coil 181d to selectively operate as a transmitter coil or a receiver coil. Alternatively, a transmitter coil and a receiver coil may be separately mounted to form the transceiver coil 181d.

The wireless power transceiver 181 of the mobile device 100 may selectively operate as a wireless power receiver for wirelessly charging the battery 185 or as a wireless power transmitter for wirelessly transmitting power to the accessory apparatus 200. For example, under the control of the wireless power control processor 181a, the wireless power transceiver 181 may function either as a wireless power receiver to wirelessly charge the battery 185 or as a wireless power transmitter to wirelessly transmit power to the accessory apparatus 200. As another example, under the control of the control unit 110 and the wireless power control processor 181a, the wireless power transceiver 181 may operate either as a wireless power receiver to wirelessly charge the battery 185 or as a wireless power transmitter to wirelessly transmit power to the accessory apparatus 200.

To charge the battery 185 of the mobile device 100, the wireless power transceiver 181 may convert AC power received through the transceiver coil 181d into DC power using the AC-DC converter 181c. To wirelessly transmit power to the reception coil 283b of the accessory apparatus 200, the wireless power transceiver 181 may convert DC power from the battery 185 into AC power by changing the time constant of the AC-DC converter 181c and feed the AC power to the transceiver coil 181d.

In one embodiment, the accessory apparatus 200 may wirelessly receive power from the mobile device 100 and wirelessly transmit the power to the accessory apparatus 200.

The wireless power control processor 283a of the accessory apparatus 200 may control the DC-AC converter 283c to convert AC power, sent by the transceiver coil 181d of the mobile device 100 to the reception coil 283b, into DC power. The regulator 283d may adjust the voltage of the DC power to a voltage suitable for charging (e.g. 5 V). The adjusted DC power may be temporarily stored in one or more capacitors or batteries (not shown). The regulator 283d and the wireless power control processor 283a may be implemented as a single entity or separate entities.

The wireless power control processor 283a, AC-DC converter 283c, and DC-AC converter 283f may be mounted on the printed circuit board 283p. In addition to the wireless power control processor 283a, the AC-DC converter 283c and the DC-AC converter 283f, other parts for wireless power transmission may be mounted on the printed circuit board 283p. The printed circuit board 283p may be placed on one of the front cover 201‴ and the rear cover 202‴.

The reception coil 283b placed on the rear cover 202‴ and the transmission coil 283g placed on the front cover 201‴ may be connected to the printed circuit board 283p.

The wireless power control processor 283a may control the DC-AC converter 283f to convert DC power (voltage) into AC power (voltage). The wireless power control processor 283a may control the AC-DC converter 283c to convert AC power (voltage) into DC power (voltage). Under the control of the wireless power control processor 283a of the accessory apparatus 200, AC power from the DC-AC converter 283f causes a current to flow through the transmission coil 283g and can be wirelessly transmitted to the wearable device 300 through magnetic fields formed between the transmission coil 283g and the reception coil 381e of the wearable device 300.

The magnetic shield member 283j and the magnetic shield member 283i corresponding to the reception coil 283b placed on the rear cover 202‴ and the transmission coil 283g placed on the front cover 201‴ may be placed closely to the reception coil 283b and the transmission coil 283g, respectively, according to the direction of wireless power reception or wireless power transmission.

The magnetic shield member 283i corresponding to the transmission coil 283g placed on the front cover 201‴ may be placed above or under the transmission coil 283g. The magnetic shield member 283i corresponding to the transmission coil 283g placed on the front cover 201‴ may be not placed on the front cover 201‴.

In FIG. 7A, when the direction of wireless power transmission is toward the front outer cover surface 201a‴ (e.g. positive z-axis direction in FIG. 7A), the magnetic shield member 283i may be placed under the transmission coil 283g. When the direction of wireless power transmission is toward the front inner cover surface 201b‴ (e.g. negative z-axis direction in FIG. 7A), the magnetic shield member 283i may be placed above the transmission coil 283g. When the direction of wireless power transmission can be toward both the front cover surfaces 201a‴ and 201b‴ (e.g. positive and negative z-axis directions), the magnetic shield member 283i may be not present on the front cover 201‴.

The magnetic shield member 283j corresponding to the reception coil 283b placed on the rear cover 202‴ (on which the mobile device 100 is mounted) may be placed above the reception coil 283*b*. For example, when the direction of wireless power reception is toward the rear outer cover surface 202*b*''' (e.g. negative z-axis direction in FIG. 7A), the magnetic shield member 283*j* may be placed above the reception coil 283*b*.

The heat dissipation member 283*h* may be placed above and/or under the printed circuit board 283*p* generating heat.

The accessory apparatus 200 of FIG. 7A is substantially similar to that described in connection with FIGS. 3A, 3B, 4A, 4B, 5A, and 5B, and thus a repeated description thereof is omitted.

In one embodiment, referring to FIGS. 6 and 7A, the accessory apparatus 200 may wirelessly receive power from the mobile device 100 and wirelessly transmit power to the wearable device 300. The accessory apparatus 200 may wirelessly receive power from the mobile device 100, convert the received power, and wirelessly transmit the converted power to the wearable device 300.

In one embodiment, the wireless power receiver 381 of the wearable device 300 may wirelessly receive power from the transmission coil 283*g* of the accessory apparatus 200.

The wireless power receiver 381 may include a wireless power control processor 381*a*, connector 381*b*, regulator 381*c*, AC-DC converter 381*d*, and reception coil 381*e*. The wireless power receiver 381 may also include an overvoltage protection circuit (not shown).

The wireless power receiver 381 may further include at least one of a heat dissipation member (not shown) and a magnetic shield member (not shown).

The wireless power control processor 381*a* of the accessory apparatus 200 may control the AC-DC converter 381*d* to convert AC power from the reception coil 381*e* into DC power. The voltage of the DC power may be adjusted by the regulator 381*c* to a voltage suitable for charging the battery 385 (e.g. 5 V). The regulator 381*c* and the wireless power control processor 381*a* may be implemented as a single entity or different entities.

The wireless power control processor 381*a* may control the regulator 381*c* to supply adjusted power (or voltage) to the battery 385.

Referring to FIGS. 6 and 7B, the elements (283*a* to 283*j*) of the accessory apparatus 200 may be substantially identical to the corresponding elements (283*a* to 281*j*) of the accessory apparatus 200 in FIG. 7A excluding the printed circuit board 283*p*2 and the magnetic shield member 283*k*.

The printed circuit board 283*p* in FIG. 7A may be separated into a printed circuit board 283*p*1 for wireless power transmission and a printed circuit board 283*p*2 for wireless power reception in FIG. 7B.

The printed circuit board 283*p*2 for wireless power reception may be used to mount a wireless power reception control processor 283*a*'' and AC-DC converter 283*c*''. The printed circuit board 283*p*2 and the reception coil 283*b* may be referred to as a wireless power receiver. The wireless power receiver may include the magnetic shield member 283*j* and/or the heat dissipation member 283*k*.

The printed circuit board 283*p*1 for wireless power transmission may be used to mount a wireless power transmission control processor 283*a* and DC-AC converter 283*f*. The printed circuit board 283*p*1 and the transmission coil 283*g* may be referred to as a wireless power transmitter. The wireless power transmitter may include the magnetic shield member 283*i* and/or the heat dissipation member 283*h*.

The wireless power reception control processor 283*a*'' may control the AC-DC converter 283*c*'' and the regulator 283*d* (refer to FIG. 6). When power is wirelessly received from the mobile device 100, the printed circuit board 283*p*2 for wireless power reception may start operation. AC power from the reception coil 283*b* may be converted by the AC-DC converter 283*c*'' into DC power. The voltage of the DC power may be adjusted by the regulator 283*d* to a voltage suitable for the DC-AC converter 283*f* (refer to FIG. 6).

The wireless power transmission control processor 283*a* may control the DC-AC converter 283*f*. The DC voltage adjusted by the regulator 283*d* may be fed to the DC-AC converter 283*f*. The DC power from the regulator 283*d* may be converted by the DC-AC converter 283*f* into AC power. AC power from the DC-AC converter 283*f* can be wirelessly transmitted to the wearable device 300 through magnetic fields formed between the transmission coil 283*g* and the reception coil 381*e* of the wearable device 300.

When power is wirelessly transmitted to the wearable device 300, the printed circuit board 283*p*1 for wireless power transmission may start operation.

A heat dissipation member 283*h* and a heat dissipation member 283*k* may be present in association with the printed circuit board 283*p*1 for wireless power transmission and the printed circuit board 283*p*2 for wireless power reception, respectively.

The magnetic shield members 283*i* and 283*j* of FIG. 7B may be substantially identical to the magnetic shield members 283*i* and 283*j* of FIG. 7A.

According to various embodiments of the present disclosure, an accessory apparatus may include: a first cover to cover or expose the front face of a mobile device, a second cover having a space to accommodate the mobile device, a coupling member to link the first cover and the second cover, a wireless power receiver circuit placed in the second cover and configured to wirelessly receive power from the mobile device accommodated in the second cover, and a wireless power transmitter circuit placed in the first cover and configured to wirelessly transmit power through magnetic fields generated by AC power that is obtained via DC-AC conversion from DC power of the wireless power receiver circuit placed in the second cover.

In one embodiment, the wireless power receiver circuit may include a wireless power reception control processor, a reception coil to wirelessly receive power from a transmission coil of the mobile device, a AC-DC converter to convert AC power from the reception coil into DC power, and a regulator to adjust the voltage of the DC power to a voltage suitable for charging at the accessory apparatus.

In one embodiment, the wireless power transmitter circuit may include a wireless power transmission control processor, a DC-AC converter to convert DC power from the regulator into AC power, and a transmission coil to wirelessly transmit power to an external reception coil through magnetic fields generated by the AC power.

In one embodiment, the transmission coil is further arranged in the front cover to wirelessly transmit the magnetic fields towards an external device. The transmission coil may be further arranged in the front cover to wirelessly transmit the magnetic fields towards an external device through at least one of an outside of the front cover or an inside of the front cover.

In one embodiment, the wireless power receiver circuit and the wireless power transmitter circuit may be controlled by the same wireless power control processor.

In one embodiment, the accessory apparatus may further include a printed circuit board on which the wireless power control processor is mounted. The reception coil of the wireless power receiver circuit and the transmission coil of the wireless power transmitter circuit may be electrically connected respectively to the printed circuit board.

In one embodiment, the wireless power transmitter circuit may further include a magnetic shield member. The magnetic shield member may be placed adjacent (e.g., above or under) the transmission coil in accordance with the direction of wireless power transmission.

In one embodiment, the accessory apparatus 200 may draw power wiredly or wirelessly from the battery 185 of the mobile device 100 and transmit power to a wearable device (or another mobile device). The accessory apparatus 200 may wiredly draw power not only from the battery 185 of the mobile device 100 but also from a charging adaptor (not shown) connected to a power source (not shown). It will be readily understood that, to wiredly draw power from the charging adaptor, the connector 281b of the accessory apparatus 200 may be changed so as to be connectable with the charging adaptor.

In an embodiment, the accessory apparatus 200 may wirelessly draw power not only from the battery 185 of the mobile device 100 but also from a wireless charging pad (not shown) connected to a power source (not shown). The accessory apparatus 200 may wirelessly draw power from the wireless charging pad and may wirelessly transmit power to a wearable device (or another mobile device). When the wireless charging pad is used, it is possible to wirelessly charge both the accessory apparatus 200 and the mobile device 100 mounted on (attached to) the accessory apparatus 200.

It can be seen that the method of the present disclosure may be implemented as program instructions, which can be stored in a computer-readable storage medium and can be executed through various computing means. The computer-readable storage medium may store program instructions, data files, data structures, or a combination thereof. Such software may be stored in a volatile or non-volatile storage medium such as a ROM, a memory such as a RAM, a memory chip, a memory device, or a memory IC, or a recordable optical or magnetic medium such as a compact disc (CD), a digital versatile disc (DVD), a magnetic disk, or a magnetic tape, regardless of its ability to be erased or re-recorded.

It can be seen that the memory of a mobile device is an example of a machine-readable storage medium which is suitable for storing a program or programs including instructions for implementing the embodiment of the present disclosure. The program or programs stored in such a storage medium may be specially designed for the present disclosure or be known to those skilled in the art.

In a feature of the present disclosure, there is provided a wireless charging accessory apparatus that is electrically connected with a mobile device through a wired connection and is capable of wirelessly charging a wearable device or electronic device placed on the front cover thereof.

In one embodiment, there is provided a wireless charging accessory apparatus that is electrically connected with the battery of a mobile device accommodated in the rear cover thereof and is capable of wirelessly charging a wearable device or electronic device placed on the front cover connected with the rear cover through a coupling member.

In one embodiment, there is provided a wireless charging accessory apparatus that is capable of drawing power wirelessly from a mobile device and wirelessly charging a wearable device or electronic device placed on the front cover thereof.

In one embodiment, there is provided a wireless charging accessory apparatus that is capable of drawing power wirelessly from the transmission coil of a mobile device accommodated in the rear cover thereof and wirelessly charging a wearable device or electronic device placed on the front cover connected with the rear cover through a coupling member.

In one embodiment, there is provided a wireless charging accessory apparatus that is capable of drawing power wiredly or wirelessly from a mobile device and wirelessly charging a wearable device or electronic device placed on the front cover thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An accessory apparatus for wirelessly charging an external device, the accessory apparatus comprising:
   a front cover;
   a rear cover configured to accommodate a mobile device;
   a coupling member configured to link the front cover to the rear cover;
   a wireless power control processor;
   a connector configured to electrically connect the accessory apparatus to the mobile device;
   a direct current-alternating current (DC-AC) converter configured to convert DC power from the connector into AC power; and
   a transmission coil configured to wirelessly transmit power through magnetic fields generated by the AC power,
   wherein the wireless power control processor, the DC-AC converter, and the transmission coil are arranged in the front cover, and
   wherein the transmission coil is further arranged in the front cover to wirelessly transmit the magnetic fields towards the external device for charging the external device, and
   wherein the transmission coil is further arranged in the front cover to wirelessly transmit the magnetic fields towards the external device through at least one of an outside of the front cover or an inside of the front cover.

2. The accessory apparatus of claim 1,
   wherein the connector is further configured to electrically connect to a battery of the mobile device, and
   wherein the connector is placed in the rear cover.

3. The accessory apparatus of claim 1, wherein the connector is further configured to electrically connect to a complementary connector of the mobile device when the rear cover accommodates the mobile device.

4. The accessory apparatus of claim 1, wherein the connector is further configured to electrically connect to a complementary connector of the mobile device, and the connector is further configured to rotate at a preset angle relative to the rear cover to electrically connect to the connector of the mobile device when the rear cover does not accommodate the mobile device and when the rear cover accommodates the mobile device.

5. The accessory apparatus of claim 1,
   wherein the front cover further comprises a transparent region to expose the portion of the screen, and
   wherein at least one of the wireless power control processor, the DC-AC converter, or the transmission coil is arranged in a region other than the transparent region.

6. The accessory apparatus of claim 1, further comprising:
a magnetic shield member in the front cover, wherein the magnetic shield member is placed adjacent to the transmission coil in accordance with a direction of wireless transmission of the magnetic fields.

7. The accessory apparatus of claim 6,
wherein the magnetic shield member is placed under the transmission coil when the direction of wireless transmission of the magnetic fields is toward an outside of the front cover, and
wherein the magnetic shield member is placed above the transmission coil when the direction of wireless transmission of the magnetic fields is toward an inside of the front cover.

8. The accessory apparatus of claim 1, further comprising:
a printed circuit board in the front cover, wherein the wireless power control processor and the DC-AC converter are mounted on the printed circuit board.

9. The accessory apparatus of claim 8, further comprising:
a heat dissipation member in the front cover, wherein the heat dissipation member is configured to dissipate heat generated by the printed circuit board.

10. An accessory apparatus comprising:
a first cover configured to cover or expose a front face of a mobile device;
a second cover comprising a space to accommodate the mobile device;
a coupling member configured to link the first cover and the second cover; and
a wireless power transmitter circuit placed in the first cover and configured to wirelessly transmit power through magnetic fields generated by alternating current (AC) power that is obtained via direct current-AC (DC-AC) conversion from DC power of a battery of the mobile device accommodated in the second cover,
wherein the magnetic fields are transmitted towards an external device for charging the external device, and
wherein the transmission coil is further arranged in the first cover to wirelessly transmit the magnetic fields towards the external device through at least one of an outside of the first cover or an inside of the first cover.

11. The accessory apparatus of claim 10, wherein the wireless power transmitter circuit comprises:
a wireless power control processor;
a connector configured to electrically connect to the battery of the mobile device;
a DC-AC converter configured to convert the DC power from the connector into the AC power; and
a transmission coil configured to wirelessly transmit power to the external device through the magnetic fields generated by the AC power.

12. An accessory apparatus comprising:
a first cover configured to cover or expose a front face of a mobile device;
a second cover comprising a space to accommodate the mobile device;
a coupling member configured to link the first cover and the second cover;
a wireless power receiver circuit placed in the second cover and configured to wirelessly receive power from the mobile device accommodated in the second cover; and
a wireless power transmitter circuit placed in the first cover and configured to wirelessly transmit power through magnetic fields generated by alternating current (AC) power that is obtained via direct current-AC (DC-AC) conversion from DC power of the wireless power receiver circuit placed in the second cover,
wherein the magnetic fields are transmitted towards an external device for charging the external device, and
wherein the transmission coil is further arranged in the first cover to wirelessly transmit the magnetic fields towards the external device through at least one of an outside of the first cover or an inside of the first cover.

13. The accessory apparatus of claim 12, wherein the wireless power receiver circuit comprises:
a wireless power reception control processor;
a reception coil configured to wirelessly receive power from a transmission coil of the mobile device;
an AC-DC converter configured to convert AC power from the reception coil into the DC power; and
a regulator configured to adjust a voltage of the DC power to be suitable for charging at the accessory apparatus.

14. The accessory apparatus of claim 13, wherein the wireless power transmitter circuit comprises:
a wireless power transmission control processor;
a DC-AC converter configured to convert the DC power from the regulator into AC power; and
the transmission coil configured to wirelessly transmit power through the magnetic fields generated by the AC power.

15. The accessory apparatus of claim 14, wherein the transmission coil is further arranged in the first cover to wirelessly transmit the magnetic fields towards the external device.

16. The accessory apparatus of claim 14,
wherein the wireless power transmitter circuit further comprises a magnetic shield member, and
wherein the magnetic shield member is placed adjacent to the transmission coil in accordance with a direction of wireless transmission of the magnetic fields.

17. The accessory apparatus of claim 13, further comprising:
a wireless power control processor configured to control the wireless power receiver circuit and the wireless power transmitter circuit, and
a printed circuit board on which the wireless power control processor is mounted, wherein the reception coil of the wireless power receiver circuit and the transmission coil of the wireless power transmitter circuit are electrically connected to the printed circuit board.

* * * * *